(12) United States Patent
Yamazaki et al.

(10) Patent No.: US 9,944,810 B2
(45) Date of Patent: Apr. 17, 2018

(54) INK COMPOSITION AND INK JET RECORDING METHOD USING SAME

(71) Applicant: DNP Fine Chemicals Co., Ltd., Yokohama-shi (JP)

(72) Inventors: Fumie Yamazaki, Yokohama (JP); Akiko Kobayashi, Yokohama (JP); Naoki Shiraishi, Yokohama (JP); Kisei Matsumoto, Yokohama (JP); Kentaro Otomo, Yokohama (JP); Yukio Sugita, Yokohama (JP)

(73) Assignee: DNP Fine Chemicals Co., Ltd., Yokohama-shi (JP)

( * ) Notice: Subject to any disclaimer, the term of this patent is extended or adjusted under 35 U.S.C. 154(b) by 0 days.

(21) Appl. No.: 15/551,780

(22) PCT Filed: Mar. 11, 2016

(86) PCT No.: PCT/JP2016/057767
§ 371 (c)(1),
(2) Date: Aug. 17, 2017

(87) PCT Pub. No.: WO2016/152580
PCT Pub. Date: Sep. 29, 2016

(65) Prior Publication Data
US 2018/0030298 A1    Feb. 1, 2018

(30) Foreign Application Priority Data

Mar. 20, 2015  (JP) ................ 2015-057983

(51) Int. Cl.
| G01D 11/00 | (2006.01) |
| C09D 11/38 | (2014.01) |
| B41J 2/01 | (2006.01) |
| C09D 11/023 | (2014.01) |
| C09D 133/12 | (2006.01) |
| C09D 11/037 | (2014.01) |
| C09D 11/107 | (2014.01) |

(52) U.S. Cl.
CPC ............ C09D 11/38 (2013.01); B41J 2/01 (2013.01); C09D 11/023 (2013.01); C09D 11/037 (2013.01); C09D 11/107 (2013.01); C09D 133/12 (2013.01)

(58) Field of Classification Search
CPC ..... C09D 11/023; C09D 11/36; C09D 11/107; B41J 2/01
USPC .............. 347/21, 100; 106/31.13, 31.6
See application file for complete search history.

(56) References Cited

U.S. PATENT DOCUMENTS

| 7,629,395 | B2 | 12/2009 | Nishiguchi et al. |
| 8,133,314 | B2 | 3/2012 | Ishihara et al. |
| 8,556,400 | B2 | 10/2013 | Yatake et al. |
| 8,614,264 | B2 | 12/2013 | Aoki et al. |
| 8,746,867 | B2 | 6/2014 | Aoyama et al. |
| 8,795,424 | B2 | 8/2014 | Ozawa |
| 8,859,636 | B2 * | 10/2014 | Kamada ............... C09D 11/101 347/100 |
| 8,911,074 | B2 | 12/2014 | Ohta |
| 9,109,133 | B2 | 8/2015 | Yamazaki et al. |
| 9,487,665 | B2 * | 11/2016 | Ishima ................. C09D 11/101 |
| 9,815,991 | B2 * | 11/2017 | Oogaki ............... C09D 11/033 |
| 2007/0263054 | A1 | 11/2007 | Yatake et al. |
| 2007/0287770 | A1 | 12/2007 | Nishiguchi et al. |
| 2010/0247874 | A1 | 9/2010 | Ishihara et al. |
| 2011/0183124 | A1 | 7/2011 | Aoki et al. |
| 2012/0052261 | A1 | 3/2012 | Aoyama et al. |
| 2013/0215175 | A1 | 8/2013 | Ozawa |
| 2013/0281593 | A1 | 10/2013 | Yamazaki et al. |
| 2013/0300799 | A1 | 11/2013 | Mizutani et al. |
| 2014/0055520 | A1 | 2/2014 | Inumaru et al. |
| 2014/0132684 | A1 | 5/2014 | Ohta |

FOREIGN PATENT DOCUMENTS

| JP | 2007-023086 A | 2/2007 |
| JP | 2007-099913 A | 4/2007 |
| JP | 2008-019431 A | 1/2008 |
| JP | 2009-035579 A | 2/2009 |
| JP | 2009-149774 A | 7/2009 |
| JP | 2010-248477 A | 11/2010 |
| JP | 2011-153250 A | 8/2011 |
| JP | 2011-236281 A | 11/2011 |
| JP | 2012-051124 A | 3/2012 |
| JP | 2012-051357 A | 3/2012 |
| JP | 2013-199634 A | 10/2013 |
| JP | 2013-256102 A | 12/2013 |
| JP | 2014-070205 A | 4/2014 |

(Continued)

OTHER PUBLICATIONS

Notice of Reasons for Rejection dated Jul. 7, 2015, issued to JP Application No. 2015-057983.

(Continued)

*Primary Examiner* — An Do
(74) *Attorney, Agent, or Firm* — Locke Lord LLP

(57) ABSTRACT

Provided is an aqueous ink jet-use ink composition which includes a binder resin, a surfactant, a pigment, a solvent and, if necessary, a pigment-dispersing resin. The binder resin has a glass transition temperature of 40-90° C. and is dispersed as resin emulsion particles. The value of A, which is defined as the sum of the product of the acid value and the content in terms of parts by mass of the binder resin and pigment-dispersing resin, is 0-200 mg KOH/g. The surfactant is a non-ionic compound represented by formula (1), and the content of solvents having boiling points of 250° C. or higher is less than 5 parts by mass relative to 100 parts by mass of the ink composition.

$$R^1O-(R^2O)_n-H \qquad (1)$$

$R^1$ is a straight-chain or branched chain alkyl group having 12-22 carbon atoms. $R^2$ is an ethylene group or propylene group.
n is an integer between 10 and 50.

20 Claims, No Drawings

(56) References Cited

FOREIGN PATENT DOCUMENTS

| JP | 2014-094495 A | 5/2014 |
| JP | 2014-101402 A | 6/2014 |
| JP | 2014-223753 A | 12/2014 |
| JP | 2015-007204 A | 1/2015 |

OTHER PUBLICATIONS

International Search Report dated May 17, 2016, issued for PCT/JP2016/057767.

* cited by examiner

INK COMPOSITION AND INK JET RECORDING METHOD USING SAME

TECHNICAL FIELD

The present invention relates to an ink composition that has excellent dispersion stability, is capable of creating a printed matter having excellent water resistance and solvent resistance, and has excellent discharge stability, and an ink jet recording method using the same.

BACKGROUND ART

As for an ink jet recording-use ink composition, when a water-soluble resin dissolved in the ink composition or a semi-dissolved colloidal dispersion is used as a binder resin, conventionally, the ink composition adheres to the vicinity of a nozzle opening of an ink jet head, which lowers liquid repellency of a nozzle surface, and flight bending, scattering, non-discharge, or the like easily occur, and discharge stability is lowered in some cases. In addition, an ink composition using a water-soluble resin or colloidal dispersion has poor water resistance and solvent resistance. Particularly when the ink composition is printed on a low absorbing substrate or a non-absorbing substrate, a printed matter has insufficient durability in some cases.

Meanwhile, a resin emulsion has been conventionally used as a binder resin (refer to Patent Documents 1 and 2). However, Patent Documents 1 and 2 use a resin emulsion having a high acid value of 50 mg KOH/g or more. In this case, an ink composition has poor water resistance and solvent resistance, and a printed matter has insufficient durability in some cases, particularly when the ink composition is printed on a low absorbing substrate or a non-absorbing substrate.

Meanwhile, as for a solvent of an ink jet recording-use ink composition, a low-volatile solvent having a high boiling point has been conventionally used in order to maintain discharge stability. However, in a case where a large amount of a solvent having a high boiling point is used, particularly when the ink composition is printed on a low absorbing substrate or a non-absorbing substrate, a drying property is significantly lowered, a large amount of energy is required for drying, a long time is required for drying, and therefore it is difficult to deal with high-speed continuous printing. Therefore, a printed matter has insufficient durability in some cases.

In addition, aqueous ink compositions generally contain glycerin as a wetting agent (refer to Patent Documents 3 to 5). Drying property becomes a problem in some cases, particularly when the ink composition is printed on a low absorbing substrate or a non-absorbing substrate. In this case, when the amount of glycerin is reduced or glycerin is removed in order to improve the drying property, a nozzle of an ink jet head becomes clogged, or the ink composition is solidified in a flow path of a printer, easily causing a problem in some cases.

There is also prior art concerning an ink composition substantially containing no glycerin (refer to Patent Documents 6 and 7). However, in Patent Document 6, it is necessary to change a printer design for a separate maintenance mechanism. In Patent Document 7, only a special pigment contains no glycerin. Therefore, these techniques are not universally applicable for a general pigment.

Patent Document 1: Japanese Unexamined Patent Application, Publication No. 2008-019431
Patent Document 2: Japanese Unexamined Patent Application, Publication No. 2007-099913
Patent Document 3: Japanese Unexamined Patent Application, Publication No. 2013-199634
Patent Document 4: Japanese Unexamined Patent Application, Publication No. 2010-248477
Patent Document 5: Japanese Unexamined Patent Application, Publication No. 2007-023086
Patent Document 6: Japanese Unexamined Patent Application, Publication No. 2013-256102
Patent Document 7: Japanese Unexamined Patent Application, Publication No. 2011-153250

DISCLOSURE OF THE INVENTION

Problems to be Solved by the Invention

An object of the present invention is to provide an aqueous ink jet-use ink composition having a quick drying property on a recording medium with a low water-absorbing property, having good printed matter durability, hardly causing discharge defects such as clogging of a head nozzle or curved discharge, and having an excellent discharge property.

Means for Solving the Problems

As a result of intensive studies to solve the above problems, the present inventors have found the following. That is, by using a compound represented by general formula (1) described below having a low predetermined value defined by an acid value and parts by mass in the total of a binder resin and a pigment-dispersing resin constituting a resin, good dispersion stability can be obtained. Furthermore, even when the content of a solvent having a high boiling point is reduced in order to perform printing on a low water-absorbing or non-water-absorbing recording medium, an ink jet recording-use ink composition hardly causing discharge defects such as clogging of an ink jet head nozzle, and having excellent discharge stability can be obtained. Specifically, the present invention provides the following.

(1) An ink jet recording-use ink composition including a binder resin, a surfactant, a pigment, a solvent, and if necessary, a pigment-dispersing resin which is a water-soluble resin, in which the ink composition includes a resin emulsion having a glass transition temperature of 40° C. or higher and 90° C. or lower as the binder resin, a value of A defined by the following formula is 0 mg KOH/g or more and 200 mg KOH/g or less, $$\text{value of } A = \Sigma(a \times b) + \Sigma(c \times d)$$

(here, a represents the content in terms of parts by mass of the pigment-dispersing resin included in 100 parts by mass of the ink composition, b represents an acid value (mg KOH/g) of the pigment-dispersing resin, $\Sigma(a \times b)$ represents a value of a×b when one pigment-dispersing resin is used, and represents the sum of values of a×b of pigment-dispersing resins when two or more pigment-dispersing resins are used, c represents the content in terms of parts by mass of the binder resin included in 100 parts by mass of the ink composition, d represents an acid value (mg KOH/g) of the binder resin, and $\Sigma(c \times d)$ represents a value of c×d when one binder resin is used, and represents the sum of values of c×d of binder resins when two or more binder resins are used), and the surfactant is a nonionic compound represented by the following general formula (1), and the content of a solvent having a boiling point of 250° C. or higher included in the solvent is less than 5 parts by mass relative to 100 parts by mass of the ink composition.

$$R^1O\text{---}(R^2O)_n\text{-H} \qquad (1)$$

($R^1$ is a straight-chain or branched chain alkyl group having 12 to 22 carbon atoms. $R^2$ represents an ethylene group or a propylene group.

n represents an integer of from 10 to 50.)

(2) The ink composition described in (1), in which the content of the compound represented by the above general formula (1) is 0.005% by mass or more and 2.0% by mass or less relative to the total amount of the ink composition.

(3) The ink composition described in (1) or (2), including a (meth)acrylic resin as the pigment-dispersing resin, in which the content of the pigment-dispersing resin is 20 parts by mass or less relative to 100 parts by mass of the binder resin.

(4) The ink composition described in any one of (1) to (3), in which a value of B defined by the following formula is 150 mg KOH/g or less.

$$\text{value of } B = \Sigma(a \times b)$$

(here, a represents the content in terms of parts by mass of the pigment-dispersing resin included in 100 parts by mass of the ink composition, b represents an acid value (mg KOH/g) of the pigment-dispersing resin, and $\Sigma(a \times b)$ represents a value of a×b when one pigment-dispersing resin is used, and represents the sum of values of a×b of pigment-dispersing resins when two or more pigment-dispersing resins are used.)

(5) The ink composition described in any one of (1) to (4), in which a value of C defined by the following formula is 150 mg KOH/g or less.

$$\text{value of } C = \Sigma(c \times d)$$

(here, c represents the content in terms of parts by mass of the binder resin included in 100 parts by mass of the ink composition, d represents an acid value (mg KOH/g) of the binder resin, and $\Sigma(c \times d)$ represents a value of c×d when one binder resin is used, and represents the sum of values of c×d of binder resins when two or more binder resins are used.)

(6) The ink composition described in any one of (1) to (5), further including a wax emulsion, in which the content of the wax emulsion is equal to or lower than the content of the pigment.

(7) The ink composition described in any one of (1) to (6), in which the solvent substantially contains no solvent having a boiling point of 280° C. or higher.

(8) An ink jet recording method including a treatment liquid applying step for applying a treatment liquid onto a recording material if necessary, and an ink composition applying step for applying the ink composition described in any one of (1) to (7) onto the recording material, in which at least the ink composition applying step is performed by an ink jet method.

(9) The ink jet recording method described in (8), in which the treatment liquid applying step is performed by an ink jet method.

(10) The ink jet recording method described in (8) or (9), in which the treatment liquid contains a polyvalent metal salt.

(11) The ink jet recording method described in any one of (8) to (10), in which the recording material has a non-absorbing or low absorbing property.

(12) The ink jet recording method described in any one of (8) to (11), in which the ink composition is discharged onto a surface of the recording material while being heated to 30° C. or higher and 60° C. or lower.

Effects of the Invention

The present invention can provide an ink jet recording-use ink composition capable of being printed on a recording medium with a low water-absorbing property, having good dispersion stability, hardly causing discharge defects such as clogging of an ink jet head nozzle, and having excellent discharge stability, and an ink jet recording method using the same.

PREFERRED MODE FOR CARRYING OUT THE INVENTION

Hereinafter, specific embodiments of the present invention will be described in detail. However, the present invention is not limited by the following embodiments in any way, but can be performed by adding changes appropriately within the scope of the object of the present invention.

[Resin]

In the present invention, a resin contains a pigment-dispersing resin which is a water-soluble resin for dispersing a pigment, if necessary, and contains a binder resin as a resin other than the pigment-dispersing resin. The pigment-dispersing resin is a water-soluble resin for dispersing a pigment, having a function of improving dispersibility of a pigment in an ink by adhering to a surface of pigment particles. The binder resin is a resin having a function of mainly fixing a pigment to a recording material. The binder resin is contained in an ink composition while the resin is dissolved or forms various forms. However, at least a part of the binder resin forms a resin emulsion to be contained as a resin emulsion. The resin emulsion indicates a state in which a resin is dispersed in an ink composition as fine resin particles due to electrostatic repulsion. The resin emulsion is different from a dissolved resin in a state in which a resin is dissolved, or a colloidal dispersion partially containing a dissolved resin. By inclusion of a resin emulsion as a binder resin, dispersion stability, discharge stability, liquid repellency, and water resistance and solvent resistance of a printed matter can be favorable.

In addition, when the amounts of an organic solvent and water generally forming a continuous phase are reduced by evaporation, penetration, or the like, a resin in an emulsion state is thickened and aggregated, suppresses penetration of a pigment into a recording medium, and can accelerate fixing to the recording medium.

In the present invention, a value of A defined by the following formula is 0 mg KOH/g or more and 200 mg KOH/g or less. The lower limit of the value of A is preferably 5 mg KOH/g or more, more preferably 10 mg KOH/g or more, still more preferably 20 mg KOH/g or more, and further still more preferably 40 mg KOH/g or more. The upper limit of the value of A is preferably 150 mg KOH/g or less, and more preferably 120 mg KOH/g or less.

$$\text{value of } A = \Sigma(a \times b) + \Sigma(c \times d)$$

(Here, a represents the content in terms of parts by mass of a pigment-dispersing resin included in 100 parts by mass of an ink composition, b represents an acid value (mg KOH/g) of the pigment-dispersing resin, $\Sigma(a \times b)$ represents a value of a×b when one pigment-dispersing resin is used, and represents the sum of values of a×b of pigment-dispersing resins when two or more pigment-dispersing resins are used, c represents the content in terms of parts by mass of a binder resin included in 100 parts by mass of the ink composition, d represents an acid value (mg KOH/g) of the binder resin, and Σ(c×d) represents a value of c×d when one binder resin is used, and represents the sum of values of c×d of binder resins when two or more binder resins are used.)

When being viewed as an entire ink composition, the acid value is largely influenced not only by an acid value of a binder resin constituting a resin but also by an acid value of a pigment-dispersing resin. Considering this, the value of A taking a product of the acid value and the content in terms of parts by mass into consideration is introduced as an index value of the sum of resin acid values in an ink composition. By setting this value of A to 200 mg KOH/g or less, water resistance and solvent resistance are improved.

Note that the acid value represents a mass (mg) of potassium hydroxide required to neutralize an acid component contained in 1 g of a sample (solid content of a resin), and is a value measured by a method in conformity with the method described in JIS K 0070. For the value of A in the present invention, the acid value may be determined by the above measurement, or the acid value may be calculated from a monomer composition of a resin or the like to be referred to.

<Binder Resin>

A binder resin in the present invention is a resin for mainly fixing a pigment in an ink composition to a recording material. At least a part of the binder resin forms a resin emulsion, and is contained in an ink composition as the resin emulsion. The binder resin is not particularly limited as long as being able to exhibit desired water resistance and solvent resistance. However, examples thereof include an acrylic resin, a polystyrene resin, a polyester resin, a vinyl chloride resin, a vinyl acetate resin, a vinyl chloride-vinyl acetate copolymer resin, a polyethylene resin, a urethane resin, a silicone resin, an acrylamide resin, an epoxy resin, and a copolymer resin and a mixture thereof.

The binder resin used in the present invention preferably contains an acrylic resin. This is because a binder resin containing an acrylic resin can make discharge stability, water resistance, and solvent resistance excellent.

The acrylic resin is not particularly limited as long as containing a (meth)acrylate monomer having no acid group or hydroxy group as a main component of constituent monomers.

Note that the acid group means that an aqueous solution or a water suspension of a monomer having an acid group indicates an acidic property. Specific examples thereof include a carboxy group, a phosphoric acid group, a sulfonic acid group, an acid anhydride thereof, and an acid halide thereof.

As the (meth)acrylate monomer, a known compound can be used, and a monofunctional (meth)acrylate can be preferably used. Examples thereof include an alkyl (meth)acrylate, an aralkyl (meth)acrylate, and an alkoxyalky (meth)acrylate. Specific examples thereof include a (meth)acrylate such as methyl (meth)acrylate, ethyl (meth)acrylate, n-propyl (meth)acrylate iso-propyl (meth)acrylate, n-butyl (meth)acrylate, sec-butyl (meth)acrylate, iso-butyl (meth)acrylate, tert-butyl (meth)acrylate, pentyl (meth)acrylate, neopentyl (meth)acrylate, hexyl (meth)acrylate, 2-ethylhexyl (meth)acrylate, octyl (meth)acrylate, iso-octyl (meth)acrylate, nonyl (meth)acrylate, iso-nonyl (meth)acrylate, dodecyl (meth)acrylate, tridecyl (meth)acrylate, stearyl (meth)acrylate, cyclopentyl (meth)acrylate, cyclohexyl (meth)acrylate, 2-methylcyclohexyl (meth)acrylate, dicyclopentanyl (meth)acrylate, dicyclopentenyl (meth)acrylate, dicyclopentanyl oxyethyl (meth)acrylate, dicyclopentenyl oxyethyl (meth)acrylate, dicyclohexyl (meth)acrylate, isobornyl (meth)acrylate, adamantyl (meth)acrylate, allyl (meth)acrylate, propargyl (meth)acrylate, phenyl (meth)acrylate, naphthyl (meth)acrylate, anthracenyl (meth)acrylate, anthraninonyl (meth)acrylate, piperonyl (meth)acrylate, salicylic (meth)acrylate, furyl (meth)acrylate, furfuryl (meth)acrylate, tetrahydrofuryl (meth)acrylate, tetrahydrofurfuryl (meth)acrylate, pyranyl (meth)acrylate, benzyl (meth)acrylate, phenethyl (meth)acrylate, cresyl (meth)acrylate, glycidyl (meth)acrylate, 3,4-epoxycyclohexylmethyl (meth)acrylate, 3,4-epoxycyclohexylethyl (meth)acrylate, 1,1,1-trifluoroethyl (meth)acrylate, parfluoroethyl (meth)acrylate, perfluoro-n-propyl (meth)acrylate, perfluoro-iso-propyl (meth)acrylate, heptadecafluorodecyl (meth)acrylate, triphenylmethyl (meth)acrylate, cumyl (meth)acrylate, 3-(N,N-dimethylamino) propyl (meth)acrylate, methoxyethyl (meth)acrylate, ethoxyethyl (meth)acrylate, butoxyethyl (meth)acrylate, 2-cyanoethyl (meth)acrylate, dimethylaminoethyl (meth)acrylate, diethylaminoethyl (meth)acrylate, trimethoxysilylpropyl (meth)acrylate, triethoxysilylpropyl (meth)acrylate, 3-methacryloxypropyl methyldiethoxy silane, or 3-methacryloxypropyl methyldimethoxy silane. Note that "(meth)acrylic" means both "acrylic" and "methacrylic". These monomers can be available from Mitsubishi Rayon Co., Ltd., NOF Corporation, Mitsubishi Chemical Corporation, Hitachi Chemical Co., Ltd., and the like.

The content of a (meth)acrylate monomer is not particularly limited as long as being contained as a main component in an acrylic resin. However, for example, the content in an acrylic resin is preferably 50% by mass or more, more preferably in a range of 60% by mass or more and 100% by mass or less, and particularly preferably in a range of 70% by mass or more and 99.99% by mass or less. This is because the content of a (meth)acrylate monomer in the above range can cause a printed matter to have excellent water resistance and solvent resistance. Note that the content of a monomer is a ratio of the monomer used to constitute a resin relative to the total monomers.

A monomer constituting an acrylic resin may contain an acid group-containing monomer having an acid group or a hydroxy group-containing monomer having a hydroxy group. Examples of the acid group-containing monomer having an acid group include a carboxyl group-containing monomer having an ethylenically unsaturated double bond and a carboxyl group, such as acrylic acid, methacrylic acid, itaconic acid, fumaric acid, or maleic acid.

The content of the acid group-containing monomer is not particularly limited as long as being able to have an acid value. However, the upper limit thereof is preferably 5% by mass or less, more preferably 3% by mass or less, and still more preferably 2% by mass or less relative to the total amount of the acrylic resin monomers. Meanwhile, the lower limit thereof is preferably 0.005% by mass or more, more preferably 0.01% by mass or more, and still more preferably 0.02% by mass or more relative to the total amount of the acrylic resin monomers. When the content ratio of a monomer having an acid group is equal to or more than the above lower limit value, dispersion stability is excellent. In addition, when the content ratio of a monomer having an acid group is equal to or less than the above upper limit value, water resistance and solvent resistance are excellent.

The hydroxy group-containing monomer is not particularly limited as long as having an unsaturated double bond and a hydroxy group. However, examples thereof include 2-hydroxyethyl (meth)acrylate, 2-hydroxypropyl (meth)acrylate, methyl α-(hydroxymethyl) (meth)acrylate, ethyl α-(hydroxymethyl) (meth)acrylate, n-butyl α-(hydroxymethyl) (meth)acrylate, 1,4-cyclohexanedimethanol mono (meth)acrylate, and 4-hydroxybutyl (meth)acrylate.

The content of the hydroxy group-containing monomer is not particularly limited as long as being able to create a printed matter having desired water resistance and solvent resistance. However, for example, the content in the acrylic resin is preferably 5% by mass or less, more preferably 3% by mass or less, and still more preferably 2% by mass or less. This is because the content in the above range makes it possible to create a printed matter having excellent water resistance and solvent resistance.

As a monomer constituting an acrylic resin, in addition to the (meth)acrylate monomer, another monomer can be used if necessary. Such another monomer is not particularly limited as long as being able to be copolymerized with the (meth)acrylate monomer and being able to cause a printed matter to have desired water resistance and solvent resistance, and may be a monofunctional monomer having one ethylenically unsaturated double bond or a polyfunctional monomer having two or more ethylenically unsaturated double bonds.

Examples thereof include a vinyl monomer such as vinyl acetate, vinyl chloride, vinylidene chloride, vinyl fluoride, vinylidene fluoride, N-vinylpyrrolidone, vinylpyridine, N-vinyl carbazole, vinyl imidazole, vinyl ether, vinyl ketone, or vinyl pyrrolidone; an aromatic vinyl monomer such as styrene, a styrene α-, o-, m-, p-alkyl, nitro, cyano, or amide ester derivative, vinyl toluene, or chlorostyrene; an olefin monomer such as ethylene, propylene, or isopropylene; a diene monomer such as butadiene or chloroprene; a vinyl cyanide monomer such as acrylonitrile or methacrylonitrile; an acrylamide monomer such as acrylamide or N,N-dimethyl acrylamide; a monomaleimide such as (meth)acrylic acid anilide, N-benzyl maleimide, N-phenyl maleimide, N-cyclohexyl maleimide, N-lauric maleimide, or N-(4-hydroxyphenyl) maleimide; and a phthalimide such as N-(meth)acryloyl phthalimide.

Examples thereof further include a diacrylate compound such as polyethylene glycol diacrylate, triethylene glycol diacrylate, or 1,3-butylene glycol diacrylate; a triacrylate compound such as trimethylolpropane triacrylate, trimethylolethane triacrylate, or tetramethylolmethane triacrylate; a dimethacrylate compound such as ethylene glycol dimethacrylate, diethylene glycol dimethacrylate, or triethylene glycol dimethacrylate; a trimethacrylate compound such as trimethylolpropane trimethacrylate or trimethylolethane trimethacrylate; and divinylbenzene.

Note that an acrylic resin can be formed using these monomers. However, a form of copolymerization of the monomers is not particularly limited. For example, a block copolymer, a random copolymer, a graft copolymer, or the like can be used.

The acid value d (mg KOH/g) of a binder resin is preferably 20 mg KOH/g or less, more preferably 15 mg KOH/g or less, still more preferably 10 mg KOH/g or less, and further still more preferably 5 mg KOH/g or less. The acid value in the above range can cause a printed matter to have excellent water resistance and solvent resistance. In addition, an interaction between a resin and a dispersant or a pigment can be reduced, and change in physical properties such as surface tension and viscosity can be suppressed to improve storage stability of an ink composition. A lower limit value thereof is preferably more than 0 mg KOH/g, more preferably 0.01 mg KOH/g or more, and still more preferably 0.03 mg KOH/g or more in order to obtain good dispersion stability. The acid value can be adjusted according to the kind of a monomer constituting a resin, the content thereof, and the like.

The part by mass c of a binder resin contained in 100 parts by mass of an ink composition is not particularly limited as long as being able to form a printed matter having desired water resistance and solvent resistance. However, for example, the part by mass c in an ink composition is preferably in a range of 0.05 parts by mass or more and 20 parts by mass or less, more preferably in a range of 0.1 parts by mass or more and 20 parts by mass or less, still more preferably in a range of 0.5 parts by mass or more and 20 parts by mass or less, and further still more preferably in a range of 1 part by mass or more and 15 parts by mass or less. The content in the above range can make water resistance and solvent resistance excellent.

Furthermore, the upper limit of the value of C, which is the sum of a product of the acid value d of a binder resin and the parts by mass c of the binder resin included in 100 parts by mass of an ink composition (value of $C=\Sigma(c \times d)$) is preferably 150 mg KOH/g or less, more preferably 120 mg KOH/g or less, and still more preferably 100 mg KOH/g or less. The lower limit of the value of C is preferably more than 0 mg KOH/g, more preferably 5 mg KOH/g or more, still more preferably 10 mg KOH/g or more, and further still more preferably 20 mg KOH/g or more. Here, c represents the content in terms of parts by mass of the binder resin included in 100 parts by mass of the ink composition, d represents an acid value (mg KOH/g) of the binder resin, and $\Sigma(c \times d)$ represents a value of $c \times d$ when one binder resin is used, and represents the sum of values of $c \times d$ of binder resins when two or more binder resins are used. The value of C in the above range can cause a printed matter to have excellent water resistance and solvent resistance, and can cause an ink composition to have good storage stability.

The hydroxy value of the binder resin is not particularly limited as long as being able to create a printed matter having desired water resistance and solvent resistance. However, the hydroxy value in terms of a solid content is preferably in a range of 0 mg KOH/g or more and 20 mg KOH/g or less, more preferably in a range of 0 mg KOH/g or more and 15 mg KOH/g or less, and particularly preferably in a range of 0 mg KOH/g or more and 10 mg KOH/g or less. The hydroxy value in the above range can create printed matter having good water resistance, solvent resistance, and friction resistance. Note that the hydroxy value represents a mass (mg) of potassium hydroxide (KOH) required for acetylating a hydroxy component contained in 1 g of a solid content of a resin, and is measured by acetylating an OH group in a sample using acetic anhydride and titrating acetic acid which has not been used with a potassium hydroxide solution in conformity with the method described in JIS K 0070.

As a method for measuring a hydroxy value, a method for acetylating a hydroxy group of a resin in a sample with acetic anhydride and neutralizing the remaining acetic acid with potassium hydroxide (KOH) can be used. Note that the hydroxy value does not include a value derived from a hydroxy group contained in a carboxy group. The hydroxyl value can be adjusted according to the kind of a monomer constituting a resin, the content thereof, and the like.

Furthermore, a value of E, which is the sum of a product of a hydroxy value e of a binder resin and the parts by mass c of the binder resin included in 100 parts by mass of an ink composition (value of $E=\Sigma(c \times e)$) is preferably 150 mg KOH/g or less, and more preferably 120 mg KOH/g or less. Here, c represents the content in terms of parts by mass of the binder resin included in 100 parts by mass of the ink composition, e represents a hydroxy value (mg KOH/g) of the binder resin, and Σ(c×e) represents a value of c×e when one binder resin is used, and represents the sum of values of c×e of binder resins when two or more binder resins are used.

The molecular weight of the binder resin is not particularly limited as long as being able to create a printed matter having desired water resistance and solvent resistance. However, for example, the molecular weight is preferably 10000 or more, more preferably in a range of 30000 or more and 1000000 or less, and particularly preferably 10000 or more and 500000 or less. The molecular weight of the binder resin in the above range can cause an emulsion state having excellent dispersion stability.

Note that the molecular weight of the binder resin indicates a weight average molecular weight Mw measured by GPC (gel permeation chromatography) (manufactured by Tosoh Corporation, HLC-8120GPC). An example of a measurement condition is as follows. That is, measurement can be performed by using N-methylpyrrolidone obtained by adding 0.01 mol/liter of lithium bromide as an elution solvent, using Mw 377400, 210500, 96000, 50400, 206500, 10850, 5460, 2930, 1300, and 580 (manufactured by Polymer Laboratories Ltd., Easi PS-2 series) and Mw 1090000 (manufactured by Tosoh Corporation) as a polystyrene standard for a calibration curve, and using TSK-GEL ALPHA-M×2 (manufactured by Tosoh Corporation) as measurement columns.

The glass transition temperature (hereinafter, also referred to as Tg) of the binder resin is in a range of 40° C. or higher and 90° C. or lower, preferably in a range of 45° C. or higher and 80° C. or lower, and particularly preferably in a range of 50° C. or higher and 75° C. or lower because a printed matter having water resistance, solvent resistance, and scratch resistance can be formed even when printing is performed on a low absorbing substrate or a non-absorbing substrate. This is because the Tg of the binder resin in the above range can cause a printed matter to have excellent durability. In addition, this is because it is possible to suppress occurrence of blocking, which is a problem that a printed surface of a printed matter adheres to another member due to low stickiness, for example, in a case of repeated printing. In addition, this is because it is possible to avoid applying a high temperature in order to form a printed matter, to make a large amount of energy unnecessary, and to make a printing substrate hardly damaged by heat. Note that the Tg of the binder resin can be adjusted according to the kind of a monomer constituting a resin, the content thereof, and the like. The glass transition temperature (Tg) can be measured by differential scanning calorimetry (DSC), for example. Note that the glass transition temperature (Tg) can be measured with a differential scanning calorimeter "DSC-50" manufactured by Shimadzu Corporation in the present invention.

The conductivity of the binder resin is not particularly limited as long as being able to form a printed matter having desired water resistance and solvent resistance. However, the conductivity is preferably 300 μs/cm or less, more preferably 200 μs/cm or less, and particularly preferably 150 μs/cm or less. Examples of a factor affecting the conductivity of the binder resin include the kind of a resin monomer, the content of an ionic group in the resin, a dissolved state, the acid value of the resin, the hydroxy value thereof, the amine value thereof, an emulsifier, an inorganic salt, an organic salt, and an amine compound. The conductivity of the binder resin in the above range can reduce the amount of an ionic group, a counter ion thereof, or ionic impurities in the binder resin, can reduce the acid value of the binder resin, and can reduce the polarity. In addition, the small amount of an ionic group or the like can reduce an influence of a pigment on dispersion stability. This is because particularly when a self-dispersion pigment into a surface of which a functional group such as a hydrophilic group is introduced is used, the low conductivity of the binder resin can reduce a reactivity between the binder resin and the self-dispersion pigment and can improve storage stability of the ink composition. In addition, from the above, a smaller lower limit of the conductivity of the resin is more preferable. However, the lower limit is usually about 20 μs/cm. This is because a resin having excellent dispersion stability and a stable quality can be manufactured easily. Note that the conductivity of the resin indicates the conductivity of an aqueous solution having a resin solid content of 1% by mass.

The following method can be used as a method for measuring the conductivity of the binder resin. That is, first, the binder resin is diluted with deionized water such that a solid content thereof is adjusted to 1% by mass, and thereafter the conductivity of the aqueous solution having a resin solid content of 1% by mass is measured using a conductivity meter. As the conductivity meter, a EC TESTR 11+ model manufactured by Eutech Instruments Ltd. can be used. The conductivity of the aqueous solution having a resin solid content of 1% by mass can be adjusted, for example, according to the kind of a resin, monomer species, a reaction mechanism, the kind and amount of an emulsifier, or the kind and amount of a neutralizing agent.

The average particle diameter of the binder resin in the ink composition is not particularly limited as long as being able to provide excellent dispersion stability, but is preferably 500 nm or less, more preferably 200 nm or less, still more preferably 150 nm or less, and further still more preferably 120 nm or less. This is because the average particle diameter in the above range can make stability of an emulsion, a discharge property of the ink composition, and gloss of a printed matter excellent. Note that the lower limit of the average particle diameter is not particularly limited, but is usually about 30 nm.

The average particle diameter can be determined by a dynamic light scattering method. The dynamic light scattering method is a method for measuring particle size using a fact that a light intensity distribution of diffracted and scattered light depends on the particle size when a particle is irradiated with laser light. For example, measurement can be performed with a Microtrac particle size distribution measuring apparatus UPA manufactured by Nikkiso Co., Ltd. or a concentration type particle size analyzer FPAR-1000 manufactured by Otsuka Electronics Co, Ltd. In addition, measurement is performed under conditions that a measurement temperature is 25° C., accumulated time is three minutes, a laser wavelength used for the measurement is 660 nm, the obtained data is analyzed by a CONTIN method, and a scattering intensity distribution is thereby obtained. A particle diameter having the highest frequency can be assumed to be an average particle diameter.

A method for synthesizing the binder resin is not particularly limited as long as being able to synthesize a resin having a desired monomer composition ratio and molecular weight, but a general synthesis method can be used. For example, when the resin is an acrylic resin, a method for mixing water, a monomer, an emulsifier, and a polymerization initiator to create an emulsion polymerization reaction, and neutralizing the mixture after the reaction can be used. Note that as the emulsifier or the like, those generally used for emulsion polymerization can be used, and specific examples thereof include those described in JP 2012-51357 A.

[Solvent]

A solvent capable of dispersing or dissolving a resin or the like can be used in the present invention. Such a solvent is preferably an aqueous solvent having water-solubility. Use of the solvent together with a resin and a surfactant can make dispersion stability of the resin better.

Here, having water-solubility means capability of dissolving 5 parts by mass or more of a solvent under 1 atm in 100 parts by mass of water at 25° C. Specifically, a solvent which can be used in the present invention preferably contains water, a water-soluble organic solvent, or a mixed solvent thereof. The content of water, a water-soluble organic solvent, or a mixed solvent thereof in all the solvents is preferably 50% by mass or more, more preferably 70% by mass or more, and particularly preferably 80% by mass or more. Inclusion of water, a water-soluble organic solvent, or a mixed solvent thereof in such a range can make dispersion stability of the resin better.

Examples of such a water-soluble organic solvent include an alkyl alcohol having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol, or n-pentanol; a monohydric alcohol such as 3-methoxy-3-methyl-1-butanol, 3-methoxy-1-propanol, 1-methoxy-2-propanol, or 3-methoxy-n-butanol; an amide such as 1-dimethyl formamide, dimethyl acetamide, 3-methoxy propanamide, 3-butoxy propanamide, N,N-dimethyl-3-methoxy propanamide, N,N-dibutyl-3-methoxy propanamide, N,N-dibutyl-3-butoxy propanamide, or N,N-dimethyl-3-butoxy propanamide; a ketone and a ketoalcohol such as acetone or diacetone alcohol; an ether such as tetrahydrofuran or dioxane; an oxyethylene or oxypropylene copolymer such as polyethylene glycol or polypropylene glycol; a diol such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, or 2-methyl-2,4-pentanediol; a triol such as glycerin, trimethylolethane, trimethylolpropane, or 1,2,6-hexanetriol; a tetrahydric alcohol such as meso-erythritol or pentaerythritol; a monoalkyl ether such as ethylene glycol monomethyl (ethyl, isopropyl, n-butyl, isobutyl, n-hexyl, or 2-ethylhexyl) ether, diethylene glycol monomethyl (ethyl, isopropyl, n-butyl, isobutyl, n-hexyl, or 2-ethylhexyl) ether, triethylene glycol monomethyl (ethyl, isopropyl, n-butyl, or isobutyl) ether, propylene glycol monomethyl (ethyl, isopropyl, n-butyl, or isobutyl) ether, or dipropylene glycol monomethyl (ethyl, isopropyl, n-butyl, or isobutyl) ether; a polyhydric alcohol dialkyl ether such as diethylene glycol dimethyl ether, diethylene glycol diethyl ether, diethylene glycol ethyl methyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether, or dipropylene glycol diethyl ether; an alkanolamine such as monoethanolamine, diethanolamine, triethanolamine, N-methyl ethanolamine, N-ethyl ethanolamine, N-butyl ethanolamine, N-methyl diethanolamine, N-ethyl diethanolamine, or N-butyl diethanolamine; a nitrogen-containing heterocyclic compound such as N-methyl-2-pyrrolidone, 2-pyrrolidone, or 1,3-dimethyl-2-imidazolidinone; and a cyclic compound such as γ-butyrolactone or sulfolane.

When the solvent contains a water-soluble organic solvent, the solvent preferably contains a water-soluble organic solvent having a higher boiling point than water. That is, the solvent contains a water-soluble organic solvent having a boiling point of preferably higher than 100° C., more preferably 150° C. or higher, particularly preferably 180° C. or higher. This is because it is possible to suppress increase in the viscosity of the ink composition adhering to a nozzle or existing in a fine tube inside an ink jet head due to volatilization of a water-soluble organic solvent in the ink composition, and to prevent the ink jet head from being damaged due to clogging of the nozzle or the tube. In addition, this is because it is possible to obtain the ink composition having good flowability, continuous discharge property, and discharge property after leaving consequently. The content of the water-soluble organic solvent having a higher boiling point than water is preferably 50% by mass or more, more preferably 70% by mass or more, and still more preferably 80% by mass or more in all the water-soluble organic solvents.

When the boiling point of a solvent is high, much energy is required for drying, and a longer drying time is also required. Therefore, it is difficult to use in high-speed continuous printing. Therefore, the boiling point of a solvent is preferably 300° C. or lower.

When printing is performed on a low absorbing substrate or a non-absorbing substrate, a solvent does not easily penetrate the substrate, and therefore it is preferable to suppress the content of a low volatile solvent, and the content of a solvent having a boiling point of 250° C. or higher in the ink composition is preferably less than 5 parts by mass relative to 100 parts by mass of the ink composition. Furthermore, it is more preferable to contain no solvent having a boiling point of 280° C. or higher substantially. Containing no solvent having a boiling point of 280° C. or higher substantially means intentionally adding no solvent having a boiling point of 280° C. or higher. For example, this means that the content of a solvent having a boiling point of 280° C. or higher is less than 1 part by mass, preferably less than 0.5 parts by mass, and more preferably less than 0.1 parts by mass relative to 100 parts by mass of the ink composition.

Examples of a solvent having a boiling point of 280° C. or higher include triethylene glycol (boiling point: 285° C.), tetraethylene glycol (boiling point: 314° C.), glycerin (boiling point: 290° C.), 1,2,6-hexane triol, trimethylol ethane, trimethylol propane, diglycerin, polyethylene glycol, and polypropylene glycol.

Examples of a solvent having a boiling point of 250° C. or higher and lower than 280° C. include tripropylene glycol (boiling point: 268° C.), tripropylene glycol monobutyl ether (boiling point: 274° C.), triethylene glycol monobutyl ether (boiling point: 271° C.), diethylene glycol mono-2-ethylhexyl ether (boiling point: 272° C.), 1,6-hexanediol (boiling point: 250° C.), and 3-methyl-1,5-pentanediol (boiling point: 250° C.)

Examples of a solvent having a boiling point of 200° C. or higher and lower than 250° C. include dipropylene glycol (boiling point: 232° C.), diethylene glycol (boiling point: 244° C.), tripropylene glycol monomethyl ether (boiling point: 242° C.), diethylene glycol monobutyl ether (boiling point: 231° C.), triethylene glycol monomethyl ether (boiling point: 249° C.), diethylene glycol monoisopropyl ether (boiling point: 207° C.), ethylene glycol mono-2-ethylhexyl ether (boiling point: 229° C.), ethylene glycol monohexyl ether (boiling point: 208° C.), dipropylene glycol monopropyl ether (boiling point: 212° C.), dipropylene glycol monobutyl ether (boiling point: 229° C.), dipropylene glycol monomethyl ether acetate (boiling point: 209° C.), diethylene glycol monobutyl ether acetate (boiling point: 247° C.), 1,3-propanediol (boiling point: 214° C.), 1,3-butanediol (boiling point: 208° C.), 1,4-butanediol (boiling point: 230° C.), 1,2-pentanediol (boiling point: 210° C.), 1,2-hexanediol (boiling point: 223° C.), 1,5-pentanediol (boiling point: 242° C.), 1,6-hexanediol (boiling point: 250° C.), 2,2,4-trimethyl-1,3-pentanediol (boiling point: 232° C.), 3-methyl-1,3-butanediol (boiling point: 203° C.), 2-methyl-1,3-pentanediol (boiling point: 214° C.), and 2-ethyl-1,3-hexanediol (boiling point: 244° C.)

Examples of a solvent having a boiling point of 180° C. or higher and lower than 200° C. include ethylene glycol (boiling point: 197° C.), propylene glycol (boiling point: 187° C.), 1,2-butanediol (boiling point: 193° C.), and 2-methyl-2,4-pentanediol (boiling point: 198° C.)

Deionized water instead of water containing various ions is preferably used as water contained in the solvent. The content of water is not particularly limited as long as being able to disperse or dissolve components. However, the content in a solvent is preferably in a range of 10% by mass or more and 95% by mass or less, more preferably in a range of 20% by mass or more and 95% by mass or less, and particularly preferably in a range of 30% by mass or more and 90% by mass or less.

The content of a water-soluble organic solvent in a solvent is preferably in a range of 5% by mass or more and 90% by mass or less, more preferably in a range of 5% by mass or more and 80% by mass or less, and particularly preferably in a range of 10% by mass or more and 70% by mass or less.

This is because the contents of water and a water-soluble organic solvent in the above ranges can make moisture retention sufficient and can suppress clogging of a nozzle or the like. In addition, the contents of water and a water-soluble organic solvent in the above ranges can make discharge by an ink jet head easy.

<Surfactant>

A surfactant which can be used in the present invention is a nonionic compound represented by the following general formula (1), improving dispersion stability of a resin emulsion in the ink composition, suppressing clogging of an ink jet head nozzle, and making discharge stability good.

$$R^1O\text{---}(R^2O)_n\text{-H} \tag{1}$$

($R^1$ is a straight-chain or branched chain alkyl group having 12 to 22 carbon atoms. $R^2$ represents an ethylene group or a propylene group.

n represents an integer of from 10 to 50.)

A resin emulsion having a low acid value as a binder resin hardly maintains dispersion stability due to electrostatic repulsion, and therefore easily causes precipitation or aggregation. Particularly the ink composition is easily aggregated when an ink composition is dried at a nozzle opening. However, due to inclusion of a surfactant of a nonionic compound represented by formula (1) in the ink composition, dispersion stability of a resin emulsion or a pigment is improved, and good discharge stability can be obtained even when the content of a low volatile solvent having a high boiling point is small.

A surfactant which can be used in the present invention is a nonionic compound, and therefore has good affinity with a hydrophobic portion of a resin emulsion formed in the ink composition. In a case where the surfactant is not a nonionic compound, but an anionic compound having an anionic hydrophilic group, for example, affinity with a hydrophobic portion of a resin emulsion is lowered, and dispersion stability is lowered. Therefore, this case is not preferable.

$R^1$ in the surfactant is a straight-chain or branched chain alkyl group having 12 to 22 carbon atoms, and therefore has good affinity with a hydrophobic portion of a resin emulsion formed in the ink composition. In a case where the number of carbon atoms in $R^1$ in the surfactant is less than 12, affinity with a hydrophobic portion of a resin emulsion formed in the ink composition is lowered, and dispersion stability of the resin emulsion in the ink composition is lowered. Therefore, this case is not preferable. In a case where the number of carbon atoms in $R^1$ in the surfactant is more than 22, solubility in water, a water-soluble organic solvent, or a mixed solvent thereof is lowered. Therefore, this case is not preferable.

$R^2$ in $\text{---}(R^2O)_n\text{---}$ in the surfactant represents an ethylene group or a propylene group. Because $R^2$ represents an ethylene group or a propylene group, hydrophilicity of an alkylene oxide chain is good. $R^2$ more preferably represents an ethylene group from a viewpoint of better hydrophilicity of the alkylene oxide chain. In a case where $\text{---}(R^2O)_n\text{---}$ contains both ethylene oxide and propylene oxide, $\text{---}(R^2O)_n\text{---}$ containing a larger amount of ethylene oxide is preferable due to better hydrophilicity.

In addition, n in $\text{---}(R^2O)_n\text{---}$ in the surfactant is 10 or more and 50 or less, and the surfactant has an alkylene oxide chain having a predetermined length. Therefore, the surfactant has good hydrophilicity. Therefore, it is estimated that the surfactant can stay around a surface of a resin emulsion to further improve electrostatic repulsion between particles of the resin emulsion, and dispersion stability of the resin emulsion in the ink composition can be improved. Therefore, dispersibility is maintained even when a solvent in the ink composition is volatilized near a nozzle or in a flow path and a solid content is concentrated. As a result, aggregation or solidification hardly occurs, and it is thereby estimated that ink clogging or a discharge defect is less likely to occur. In a case where n in $\text{---}(R^2O)_n\text{---}$ in the surfactant is less than 10, the alkylene oxide chain is short, and a dispersion stabilizing effect of the resin emulsion is reduced. Therefore, this case is not preferable. In a case where n is more than 50, the alkylene oxide chain is long, and solubility in the ink composition is insufficient or a balance between affinity with a resin emulsion and affinity with a solvent is insufficient. Therefore, dispersion stability of the resin emulsion in the ink composition is lowered. Therefore, this case is not preferable.

The content of the compound represented by formula (1) is not particularly limited as long as being able to improve dispersion stability of a resin emulsion or a pigment in the ink composition. The content of a compound represented by formula (1) is preferably 0.005% by mass or more, more preferably 0.01% by mass or more, and particularly preferably 0.05% by mass or more relative to the total amount of the ink composition. The upper limit thereof is preferably 5.0% by mass or less, more preferably 3.0% by mass or less, and particularly preferably 2.0% by mass or less. The content of a compound represented by formula (1) in the above range can make dispersion stability of a resin emulsion excellent. Therefore, the content of a compound represented by formula (1) in the above range can bring about an ink jet recording-use ink composition hardly causing discharge defects such as clogging of an ink jet head nozzle, and having excellent discharge stability.

Specific examples of a compound represented by formula (1) include Emulgen 320P (polyoxyethylene (n=12) stearyl ether, HLB=13.9), Emulgen 350 (polyoxyethylene (n=50) stearyl ether, HLB=17.8), Emulgen 430 (polyoxyethylene (n=30) oleyl ether, HLB=16.2), Emulgen 130K (polyoxyethylene (n=41) lauryl ether, HLB=18.1), and Emulgen 150 (polyoxyethylene (n=47) lauryl ether, HLB=18.4) manufactured by Kao Corporation; Noigen TDS-120 (polyoxyethylene (n=12) tridecyl ether, HLB=14.8) Noigen TDS-200D (polyoxyethylene (n=20) tridecyl ether, HLB=16.3), and Noigen TDS-500F (polyoxyethylene (n=50) tridecyl ether, HLB=18.3) manufactured by DKS Co., Ltd.; Buraunon SR-715 (polyoxyethylene (n=15) stearyl ether, HLB=13.5), Buraunon SR-720 (polyoxyethylene (n=20) stearyl ether, HLB=15.2), Buraunon SR-730 (polyoxyethylene (n=30) stearyl ether, HLB=16.6), Buraunon SR-750 (polyoxyethylene (n=50) stearyl ether, HLB=17.8), Buraunon EN-1520A (polyoxyethylene (n=20) oleyl ether, HLB=15.4), Buraunon EN-1530 (polyoxyethylene (n=30) oleyl ether, HLB=16.5), and Buraunon EN-1540 (polyoxyethylene (n=40) oleyl ether, HLB=17.4) manufactured by Aoki Oil Industrial Co., Ltd.; Newcol 2310, Newcol 2320, Newcol 2327, Newcol 1545, and Newcol 1820 manufactured by Nippon Nyukazai Co., Ltd.; and NIKKOL BPS 20 and NIKKOL BPS 30 manufactured by Nikko Chemicals Co., Ltd. However, the present invention is not limited thereto.

<Pigment>

A pigment generally used for an ink composition can be used as a pigment which can be used in the present invention. Examples thereof include an inorganic pigment and an organic pigment. These pigments may be used singly or in a combination of two or more kinds thereof.

Examples of the organic pigment which can be used in the present invention include an insoluble azo pigment, a soluble azo pigment, a derivative from a dye, a phthalocyanine pigment, a quinacridone pigment, a perylene pigment, a dioxazine pigment, a nickel azo pigment, an isoindolinone pigment, a pyranthrone pigment, a thioindigo pigment, a condensed azo pigment, a benzimidazolone pigment, a quinophthalone pigment, an isoindoline pigment, an organic solid solution pigment such as a quinacridone solid solution pigment or a perylene solid solution pigment, and carbon black as another pigment.

When an organic pigment is illustrated with a color index (C.I.) number, examples thereof include C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, and 214; C.I. Pigment Red 5, 7, 9, 12, 48, 49, 52, 53, 57, 97, 112, 122, 123, 149, 168, 177, 180, 184, 192, 202, 206, 209, 215, 216, 217, 220, 223, 224, 226, 227, 228, 238, 240, and 254; C.I. Pigment Orange 16, 36, 43, 51, 55, 59, 61, 64, and 71; C.I. Pigment Violet 19, 23, 29, 30, 37, 40, and 50; C.I. Pigment Blue 15, 15:1, 15:3, 15:4, 15:6, 16, 22, 60, and 64; C.I. Pigment Green 7, 36, and 58; and C.I. Pigment Brown 23, 25, and 26.

Examples of the inorganic pigment which can be used in the present invention include barium sulfate, iron oxide, zinc oxide, barium carbonate, barium sulfate, silica, clay, talc, titanium oxide, calcium carbonate, synthetic mica, alumina, zinc oxide, lead sulfate, yellow lead, zinc yellow, red iron oxide (III), cadmium red, ultramarine blue, Prussian blue, chromium oxide green, cobalt green, amber, titanium black, synthetic iron black, and an inorganic solid solution pigment.

The average dispersion particle diameter of a pigment which can be used in the present invention is not particularly limited as long as being able to perform desired coloration Although depending on the kind of a pigment, the average dispersion particle diameter is preferably in a range of 10 nm or more and 200 nm or less, and more preferably in a range of 30 nm or more and 150 nm or less from a viewpoint of obtaining good dispersion stability of a pigment and a sufficient coloring power. An average dispersion particle diameter of 200 nm or less hardly causes clogging of an ink jet head nozzle and can bring about a homogeneous image with high reproducibility. An average dispersion particle diameter of 10 nm or more can make the light resistance of an obtained printed matter good.

The content of a pigment which can be used in the present invention is not particularly limited as long as being able to form a desired image, and is adjusted appropriately. Specifically, although depending on the kind of a pigment, the content is preferably in a range of 0.05% by mass or more and 20% by mass or less, and more preferably in a range of 0.1% by mass or more and 10% by mass or less relative to the total amount of the ink composition. The content of a pigment in a range of 0.05% by mass or more and 20% by mass or less can make a balance between dispersion stability and coloring power of the pigment excellent.

The pigment which can be used in the present invention may be a pigment dispersion obtained by dispersing a pigment in an aqueous solvent with a pigment-dispersing resin, or a pigment dispersion which is a self-dispersing pigment obtained by modifying a hydrophilic group directly on a surface of the pigment. Here, the pigment-dispersing resin means a water-soluble resin which adheres to a part of a surface of a pigment and thereby improves dispersibility of the pigment in an ink composition. The water-soluble resin means a resin which is dissolved in an amount of 1 part by mass or more under 1 atm in 100 parts by mass of water at 25° C. By making the pigment-dispersing resin which is a water-soluble resin adhere to a part of a surface of a pigment, dispersibility of the pigment in an ink composition can be improved, and a high-gloss image can be obtained. The pigment which can be used in the present invention may be a combination of a plurality of organic pigments and inorganic pigments, or a combination of a pigment dispersion dispersed in an aqueous solvent with a pigment-dispersing resin and a self-dispersing pigment.

Examples of the self-dispersing pigment which can be used in the present invention include a pigment modified with a carbonyl group, a carboxyl group, a hydroxyl group, a sulfonic acid group, or a phosphorus-containing group having at least one P—O or P=O bond described in JP 2012-51357 A as a hydrophilic group. Examples of a commercially available product thereof include CAB-O-JET 200, CAB-O-JET 250C, CAB-O-JET 260M, CAB-O-JET 270Y, CAB-O-JET 740Y, CAB-O-JET 300, CAB-0-JET 400, CAB-O-JET 450C, CAB-O-JET 465M, CAB-O-JET 470Y, CAB-O-JET 480V, CAB-O-JET 352K, CAB-O-JET 554B, and CAB-O-JET 1027R manufactured by Cabot Specialty Chemicals Inc.; Microjet blalack 162, Aqua-Black 001, BONJET BLACK CW-1, BONJET BLACK CW-2, and BONJET BLACK CW-3 manufactured by Orient Chemical Industries Co., Ltd.; and LIOJET WD BLACK 002C manufactured by Toyo Ink Co., Ltd.

A water-soluble polymer dispersant can be preferably used as the pigment-dispersing resin. Examples of the water-soluble polymer dispersant include a dispersant having a polyester, polyacrylic, polyurethane, polyamine, or polycaprolactone main chain and having a polar group such as an amino group, a carboxy group, a sulfo group, or a hydroxy group as a side chain. Examples thereof include a (co) polymer of an unsaturated carboxylate such as a polyacrylate; a copolymer of an aromatic vinyl compound such as styrene or α-methylstyrene and an unsaturated carboxylate such as an acrylate; a (partial) amine salt, a (partial) ammonium salt, and a (partial) alkylamine salt of a (co)polymer of an unsaturated carboxylic acid such as polyacrylic acid; a (co)polymer of a hydroxy group-containing unsaturated carboxylate such as a hydroxy group-containing polyacrylate, and a modified product thereof; a polyurethane; an unsaturated polyamide; a polysiloxane; a long-chain polyaminoamide phosphate; a polyethyleneimine derivative (an amide obtained by a reaction between poly (lower alkylene imine) and a free carboxyl group-containing polyester, and a base thereof); and a polyallylamine derivative (a reaction product obtained by a reaction between polyallylamine and at least one selected from three compounds of a polyester having a free carboxyl group, a polyamide, and a condensate of an ester and an amide (polyester amide)). Among these compounds, a water-soluble polymer dispersant containing a (meth)acrylic resin is preferable from a viewpoint of dispersion stability of an ink composition and image clearness of a printed matter. In addition, a water-soluble polymer dispersant having an acidic group as functional group is preferable from a viewpoint of dispersion stability and compatibility.

Specific examples of the water-soluble polymer dispersant include SMA1440, SMA2625, SMA17352, SMA3840, SMA1000, SMA2000, and SMA3000 manufactured by SARTOMER Co.; JONCRYL67, JONCRYL678, JONCRYL586, JONCRYL611, JONCRYL680, JONCRYL682, JONCRYL690, JONCRYL819, JONCRYL-JDX5050, EFKA4550, EFKA4560, EFKA4585, EFKA5220, and EFKA6230 manufactured by BASF Corporation; SOLSPERSE20000, SOLSPERSE27000, SOLSPERSE41000, SOLSPERSE41090, SOLSPERSE43000, SOLSPERSE44000, SOLSPERSE46000, SOLSPERSE47000, and SOLSPERSE54000 manufactured by Lubrizol Corporation; BYKJET-9150, BYKJET-9151, BYKJET-9170, DISPERBYK-168, DISPERBYK-190, DISPERBYK-198, DISPERBYK-2010, DISPERBYK-2012, and DISPERBYK-2015 manufactured by BYK-Chemie GmbH.

The acid value b (mg KOH/g) of the pigment-dispersing resin is preferably 3 mg KOH/g or more and 300 mg KOH/g or less, and more preferably 5 mg KOH/g or more and 200 mg KOH/g or less. The acid value of 3 mg KOH/g or more improves dispersibility of a pigment, and is therefore preferable. The acid value of 300 mg KOH/g or less can improve water resistance of a printed matter, and is therefore preferable.

The content of the pigment-dispersing resin is preferably 20 parts by mass or less, and more preferably 10 parts by mass or less relative to 100 parts by mass of the binder resin. By setting the content of the pigment-dispersing resin to a value in such a range, scratch resistance and solvent resistance of a printed matter can be more preferable. Note that a value of D (value of D=Σa/Σc) in Examples described below means a ratio of the pigment-dispersing resin relative to the binder resin. Note that Σa is the sum of the content in terms of parts by mass of a pigment-dispersing resin contained in 100 parts by mass of the ink composition, and that Σc is the sum of the content in terms of parts by mass of a binder resin contained in 100 parts by mass of the ink composition. The upper limit value of the value of D is preferably 0.2 or less, more preferably 0.15 or less, and still more preferably 0.1 or less. The upper limit value of the value of D in this range makes water resistance and solvent resistance good, and is therefore preferable. The lower limit value of the value of D is preferably 0.005 or more, and more preferably 0.01 or more in order to maintain a good dispersion state of a pigment when a pigment-dispersing resin is contained. When a self-dispersing pigment is used as a pigment, a pigment-dispersing resin does not have to be contained.

Furthermore, the upper limit of the value of B, which is the sum of a product of the acid value b of a pigment-dispersing resin and the parts by mass a of the pigment-dispersing resin contained in 100 parts by mass of an ink composition (value of B=Σ(a×b)) is preferably 150 mg KOH/g or less, more preferably 120 mg KOH/g or less, and still more preferably 100 mg KOH/g or less. The lower limit of the value of B is preferably more than 0 mg KOH/g, more preferably 10 mg KOH/g or more, and still more preferably 20 mg KOH/g or more in order to make dispersion stability good. By setting the value of B to 150 mg KOH/g or less, water resistance of a printed matter can be improved. Not that Σ(a×b) represents a value of a×b when one pigment-dispersing resin is used, and represents the sum of values of a×b of pigment-dispersing resins when two or more pigment-dispersing resins are used.

The molecular weight of the pigment-dispersing resin is not particularly limited as long as being able to dissolve a pigment in the ink composition, but is for example, preferably 500 or more and 50,000 or less, and more preferably 1000 or more and 30000 or less. The molecular weight of the pigment-dispersing resin in the above range can make dispersion stability of a pigment excellent.

<Wax Emulsion>

The ink jet recording-use ink composition of the present invention may contain a wax emulsion the content of which is equal to or lower than that of a pigment, if necessary. By inclusion of the wax emulsion the content of which is equal to or lower than that of a pigment, an ink composition having excellent storage stability and discharge stability can be obtained, and an ink composition having excellent scratch resistance and capable of manufacturing a glossy printed matter can be obtained. Note that a polyolefin wax generally indicates a soft polyolefin having a relatively low molecular weight of less than 10,000, and is different from a hard polyolefin resin having a molecular weight of 100,000 or more, used in a film-forming material or the like. For example, by mixing a heated and melted wax which is a solid at room temperature, hot water, and an emulsifier, a wax emulsion can be obtained. Preferably, a wax emulsion which can be used in the present invention contains a polyolefin wax having a melting point of 85° C. or higher and 140° C. or lower, and the average particle diameter of the wax emulsion is 140 nm or less.

Examples of the wax emulsion include AQUACER-507, AQUACER-513, AQUACER-515, AQUACER-526, AQUACER-531, AQUACER-533, AQUACER-535, AQUACER-537, AQUACER-539, AQUACER-552, AQUACER-840, and AQUACER-1547 (manufactured by BYK-Chemie GmbH), Nopcoat PEM-17 (manufactured by San Nopco Limited), and JONCRYLWAX4, JONCRYLWAX26, JONCRYLWAX28, and JONCRYLWAX120 (manufactured by BASF Corporation).

<Others>

A surfactant used for the ink composition of the present invention contains a compound represented by the above formula (1), but may contain a surfactant other than the compound represented by the above formula (1), if necessary.

The other surfactant is not particularly limited as long as not inhibiting an action of a compound represented by the above formula (1). However, examples thereof include a polysiloxane compound, an anionic surfactant, a nonionic surfactant, a fluorine surfactant, an alkylene oxide modified acetylene glycol surfactant, and an alkylene oxide non-modified acetylene glycol surfactant.

In the present invention, particularly, it is preferable to contain any one of an alkylene oxide non-modified acetylene glycol surfactant, an alkylene oxide modified acetylene glycol surfactant, and a polysiloxane compound as a surface tension adjusting agent because a wet-spreading property of the ink composition with respect to a recording material can be better.

Specific examples of the alkylene oxide non-modified acetylene glycol surfactant include 2,5-dimethyl-3-hexyne-2,5-diol, 3,6-dimethyl-4-octyne-3,6-diol, 2,4,7,9-tetramethyl-5-decyne-4,7-diol, 3,5-dimethyl-1-hexyn-3-ol, 3-methyl-1-butyn-3-ol, 3-methyl-1-pentyn-3-ol, 3-hexyne-2,5-diol, and 2-butyne-1,4-diol. As a commercially available product thereof, Surfynol 61, 82, and 104 (all manufactured by Air Products and Chemicals, Inc.) and the like can be used.

Specific examples of the alkylene oxide modified acetylene glycol surfactant include Surfynol 420, 440, 465, 485, TG, and 2502, and Dynol 604 and 607 (all manufactured by Air Products and Chemicals, Inc.), Surfynol SE and MD-20, and Olfine E1004, E1010, PD-004, EXP4300, PD-501, PD-502, and SPC (all manufactured by Nissin Chemical Co., Ltd.), and Acetylenol EH, E40, E60, E81, E100, and E200 (all manufactured by Kawaken Fine Chemicals Co., Ltd.).

Examples of a commercially available product of the polysiloxane compound include FZ-2122, FZ-2110, FZ-7006, FZ-2166, FZ-2164, FZ-7001, FZ-2120, SH 8400, FZ-7002, FZ-2104, 8029 ADDITIVE, 8032 ADDITIVE, 57 ADDITIVE, 67 ADDITIVE, and 8616 ADDITIVE (all manufactured by Dow Corning Toray Co., Ltd.), KF-6012, KF-6015, KF-6004, KF-6013, KF-6011, KF-6043, KP-104, 110, 112, 323, and 341 (all manufactured by Shin-Etsu Chemical Co.), BYK-300/302, BYK-301, BYK-306, BYK-307, BYK-320, BYK-325, BYK-330, BYK-331, BYK-333, BYK-337, BYK-341, BYK-342, BYK-344, BYK-345/346, BYK-347, BYK-348, BYK-349, BYK-375, BYK-377, BYK-378, BYK-UV3500, BYK-UV3510, BYK-310, BYK-315, BYK-370, BYK-UV3570, BYK-322, BYK-323, BYK-3455, and BYK-Silclean3700 (all manufactured by BYK-Chemie GmbH), Silface SAG503A, Silface SJM-002, and Silface SJM-003 (all manufactured by Nissin Chemical Co., Ltd.), and TEGO Twin 4000, TEGO Twin 4100, TEGO Wet 240, TEGO Wet 250, and TEGO Wet 240 (all manufactured by Evonik Degussa GmbH). In the present invention, among these compounds, a polyether group-modified polysiloxane compound having a polyether group can be preferably used, and a water-soluble polyether group-modified polysiloxane compound can be particularly preferably used.

In addition, specific examples of the anionic surfactant, the nonionic surfactant, the fluorine surfactant, and the alkylene oxide modified acetylene glycol surfactant include EMAL, LATEMUL, NEOPELEX, and DEMOL (these are all anionic surfactants; manufactured by Kao Corporation), SUNNOL, LIPOLAN, LIPON, and LIPAL (these are all anionic surfactants, manufactured by Lion Corporation), NOIGEN, EPAN, and SORGEN (these are all nonionic surfactants; manufactured by DKS Co., Ltd.), EMULGEN, AMIET, and EMASOL (these are all nonionic surfactants; manufactured by Kao Corporation), NAROACTY, EMULMIN, and SANNONIC (these are all nonionic surfactants; manufactured by Sanyo Chemical Industries, Ltd.), Megafac (fluorine surfactant; manufactured by DIC Co., Ltd.), Surflon (fluorine surfactant; manufactured by AGC Seimi Chemical Co., Ltd.), AEROSOL TR-70, TR-70HG, OT-75, OT-N, MA-80, IB-45, EF-800, and A-102 manufactured by Cytec Industries Japan LLC; PELEX OT-P, PELEX CS, PELEX TR, and PELEX TA manufactured by Kao Corporation; and Newcol 290-A, Newcol 290-KS, Newcol 291-M, Newcol 291-PG, Newcol 291-GL, Newcol 292-PG, Newcol 293, and Newcol 297 (these are all anionic surfactants) manufactured by Nippon Nyukazai Co., Ltd. The contents of these surfactants are adjusted appropriately in accordance with the content of a solvent, a resin, a pigment, or another surfactant.

The ink composition of the present invention includes a binder resin, a surfactant, a pigment, a solvent, and if necessary, a pigment-dispersing resin. However, the ink composition may further include other components, if necessary. Examples of the other components include a penetrating agent, a wetting agent, a preservative, an antioxidant, a conductivity adjusting agent, a pH adjusting agent, a viscosity adjusting agent, a defoaming agent, and an oxygen scavenger.

For example, as a basic compound for adjusting the pH to 6.0 or more and 10.0 or less, a compound selected appropriately from conventionally known basic compounds can be used. An inorganic basic compound, an organic basic compound, or a combination thereof may be used. Specific examples of the inorganic basic compound include ammonia, sodium hydroxide, potassium hydroxide, sodium carbonate, potassium carbonate, sodium hydrogen carbonate, and potassium hydrogen carbonate. Among the inorganic basic compounds, a sodium salt or a potassium salt is preferable in view of storage stability and discharge stability. Specific examples of the organic basic compound include an alkyl amine such as dimethylamine, diethylamine, or triethylamine; and an amino alcohol such as triethanolamine, 1-(dimethylamino)-2-propanol, N,N-dimethyl-2-aminoethanol, N-benzyl ethanolamine, N,N-dimethyl isopropanolamine, 1-amino-2-propanol, N-methylethanolamine, N,N-diethyl-2-aminoethanol, 2-(dimethylamino)-2-methyl-1-propanol, 3-(dimethylamino)-1-propanol, 2-amino-2-methyl-1-propanol, 3-(methylamino)-1-propanol, N-ethyl ethanolamine, 2-aminoethanol, N-t-butyl ethanolamine, 3-amino-1-propanol, N-n-butyl ethanolamine, diethanolamine, 3-(dimethylamino)-1,2-propanediol, 2-(2-aminoethoxy) ethanol, N,N-dibutyl ethanolamine, 2-(2-aminoethylamino) ethanol, N-methyldiethanolamine, hydroxyethyl piperazine, 3-methylamino-1,2-propanediol, N-ethyl diethanolamine, 2-phenyl-2-aminoethanol, N-n-butyl diethanolamine, N-phenyl diethanolamine, N-t-butyl diethanolamine, or 2-amino-1,3-propanediol. When an organic basic compound is used, an amino alcohol having a boiling point of 100° C. or higher and 280° C. or lower is preferable in view of safety, storage stability, and discharge stability. In the present invention, the basic compounds can be used singly or in a combination of two or more kinds thereof.

<Method for Preparing Ink Jet Recording-Use Ink Composition>

A method for preparing an ink jet recording-use ink composition is not particularly limited. Examples thereof include a preparation method by adding a self-dispersion pigment to an aqueous solvent, dispersing the pigment, and then adding a binder resin, a surfactant, and if necessary, other components; a preparation method by adding a pigment and a dispersant to an aqueous solvent, dispersing the pigment, and then adding a binder resin, a surfactant, and if necessary, other components; and a preparation method by adding a pigment, a binder resin, a surfactant, and if necessary, other components to an aqueous solvent, and then dispersing the pigment.

The pH of the ink jet recording-use ink composition of the present invention is preferably 6.0 or more and 10.0 or less, and more preferably 7.0 or more and 9.0 or less. The pH of 6.0 or more can maintain dispersion stability of a pigment or a resin, hardly causes aggregation or precipitation, and can make storage stability of an ink composition good. On the other hand, the pH of 10.0 or less is not too high, and the safety of workers can be therefore secured. The pH of 6.0 or more and 10.0 or less can suppress damage due to corrosion of a member of a device or the like. The pH of the ink jet recording-use ink composition can be adjusted by adding a known acidic substance or basic substance.

The surface tension of the ink jet recording-use ink composition is preferably 32 mN/m or less. The surface tension is more preferably 30 mN/m or less, and still more preferably 28 mN/m or less from a viewpoint of being able to suppress color unevenness and white spots. On the other hand, the surface tension of the ink composition is preferably 20 mN/m or more from a viewpoint of improving discharge stability of the ink composition from a discharge head. Note that the surface tension can be measured, for example, by a Wilhelmy method (Model: CBVP-Z manufactured by Kyowa Interface Science Co., Ltd.) at a measurement temperature of 25° C.

The viscosity of the ink jet recording-use ink composition is not particularly limited as long as being in a range capable of discharging the ink composition from an ink jet head. The viscosity is appropriately adjusted to a value in a range suitable for an ink jet head to be used. Note that a method for measuring the viscosity is not particularly limited as long as being able to measure the viscosity accurately. However, examples thereof include a method using a viscosity measuring device such as a rheometer, a B-type viscometer, or a capillary viscometer. The capillary viscosity measuring method can be performed according to a method described in DIN 53015 or ISO/DIS 12058. More specifically, measurement can be performed using a capillary viscometer "AMVn" manufactured by Anton Paar GmbH as a measuring device at a measurement temperature of 25° C.

Furthermore, when a treatment liquid applying step for applying a treatment liquid onto a recording material with a treatment liquid in advance is provided, the surface tension of the ink composition is preferably higher than that of the treatment liquid. Use of such an ink composition can suppress feathering and color bleeding to make it possible to obtain a clear image. In addition, a difference between the surface tension of the ink composition and the surface tension of the treatment liquid is preferably 5 mN/m or less, and more preferably 3 mN/m or less from a viewpoint of being able to suppress unevenness to obtain a clear image. The surface tension of the ink composition can be adjusted by appropriately selecting an aqueous solvent, a surfactant, or the like.

<Ink Jet Recording Method>

The ink jet recording method of the present invention includes a treatment liquid applying step for applying a treatment liquid onto a recording material if necessary, and an ink composition applying step for ink jet-recording an ink composition on the recording material.

[Treatment Liquid Applying Step]

The treatment liquid applying step is a step for applying a treatment liquid onto a recording material.

<Recording Material>

In the ink jet recording method of the present invention, the recording material is not particularly limited, but any one of an absorbing substrate, a low absorbing substrate, and a non-absorbing substrate can be suitably used. Examples of the absorbing substrate include uncoated paper such as woody paper, medium-quality paper, fine paper, or copy paper (PCC); and a fabric such as cotton, a chemical fiber fabric, silk, hemp, or a nonwoven fabric. Particularly, the ink jet recording method of the present invention is suitably applied to uncoated paper from a viewpoint of easily suppressing feathering and strike-through. Note that a test for an absorption property of a substrate can be performed by JAPAN TAPPI Paper Pulp Test Method No. 51-87, for example. A coating liquid to lower penetration and absorption of an ink composition is not applied onto uncoated paper. Therefore, the uncoated paper has a high absorption property.

Examples of the low absorbing substrate include coated paper such as slightly coated paper, lightweight coated paper, coated paper, art paper, or cast paper. The coated paper is obtained by applying a coating liquid prepared by adding a white pigment or a binder component to improve surface smoothness, and absorption or penetration of an ink composition into the coated paper does not easily occur. Examples of the non-absorbing substrate include a plastic film formed of a polyester resin, a polypropylene resin, a vinyl chloride resin, a polyimide resin, or the like; metal, metallized paper, glass, synthetic rubber, natural rubber, and leather. The ink jet recording method of the present invention can be used suitably even when a low absorbing substrate having a low ink composition penetration property or a non-absorbing substrate is used. The ink jet recording method makes it possible to obtain a clear image having no color unevenness and having color bleeding suppressed.

<Treatment Liquid>

The treatment liquid is preferably a treatment liquid containing a divalent or higher valent metal salt and a solvent, containing at least water as the solvent, containing 5 parts by mass or less of the solvent having a boiling point of 280° C. or higher relative to 100 parts by mass of the treatment liquid, and having the pH of 5.0 or more and 10.0 or less. Use of such a treatment liquid can suppress feathering and strike-through, which become problems particularly when an absorbing substrate is used as a recording material, and can suppress white spots and color bleeding, which become problems particularly when a low absorbing substrate or a non-absorbing substrate is used as a recording material. Therefore, bleeding and white spots can be suppressed regardless of a recording material. Furthermore, an obtained printed matter has an excellent long-term storage property. In addition, a drying property is excellent, and deterioration of a device can be suppressed.

A treatment liquid which can be used in the ink jet recording method of the present invention preferably contains at least a divalent or higher valent metal salt and a solvent. In addition, the treatment liquid may further contain another component, if necessary, in a range not impairing an effect of the present invention. Hereinafter, components contained in the treatment liquid which can be used in the present invention will be described.

(1) Divalent or Higher Valent Metal Salt

The divalent or higher valent metal salt contained in the treatment liquid improves a fixing property of an ink composition on the recording material. As the divalent or higher valent metal salt, a metal salt appropriately selected from known metal salts constituted by a polyvalent metal ion and an anion can be used. Examples of the polyvalent metal ion include a calcium ion, a magnesium ion, an aluminum ion, a titanium ion, an iron (II) ion, an iron (III) ion, a cobalt ion, a nickel ion, a copper ion, a zinc ion, a barium ion, and a strontium ion. Among these ions, at least one selected from a calcium ion, a magnesium ion, a nickel ion, and a zinc ion is preferable from a viewpoint of the magnitude of an interaction with a pigment in the ink jet ink composition described below.

The anion may be an inorganic anion or an organic anion. Particularly, an organic anion is preferably used from a viewpoint of making a long-term storage property of a printed matter excellent and suppressing deterioration of a device.

Preferable specific examples of the inorganic anion include a chloride ion, a bromide ion, a nitrate ion, and a sulfate ion. However, the inorganic anion is not limited thereto. Preferable specific examples of the organic anion include an ion of an organic acid such as a pantothenate ion, a pantoate ion, a propionate ion, an ascorbate ion, an acetate ion, a malate ion, an o-benzoic acid sulfimide ion, a lactate ion, a benzoate ion, a gluconate ion, a salicylate ion, an oxalate ion, or a citrate ion. However, the organic anion is not limited thereto.

Among these salts, one or more selected from a calcium salt, a magnesium salt, a nickel salt, an aluminum salt, and a zinc salt having solubility of 0.1 mol/liter or more in water are preferable. One or more selected from a calcium salt, a magnesium salt, a nickel salt, and a zinc salt are more preferable. This is because a metal salt having solubility of 0.1 mol/liter or more in water has a large interaction with a pigment or a resin in an ink composition.

The divalent or higher valent metal salt which can be used in the present invention can be obtained by combining a polyvalent metal ion and an anion arbitrarily, and may be an inorganic salt having an inorganic anion or an organic acid salt having an organic anion.

As a specific example of the inorganic salt, examples of the calcium salt and the magnesium salt include calcium chloride, magnesium chloride, calcium bromide, magnesium bromide, calcium nitrate, magnesium nitrate, and magnesium sulfate. However, the inorganic salt is not limited thereto. Among these inorganic salts, a chloride, a nitrate, and a sulfate generally having high solubility in water are more preferable, and a nitrate and a sulfate are still more preferable.

Specific examples of the organic acid salt include calcium salts, magnesium salts, nickel salts, and zinc salts of pantothenic acid, pantoic acid, propionic acid, ascorbic acid, acetic acid, malic acid, o-benzoic acid sulfimide, lactic acid, benzoic acid, gluconic acid, salicylic acid, oxalic acid, and citric acid. However, the organic acid salt is not limited thereto. Among these organic acid salts, calcium salts and magnesium salts of pantothenic acid, propionic acid, and acetic acid are more preferable from a viewpoint of suppressing feathering and bleeding. The divalent or higher valent metal salts which can be used in the present invention can be used singly or in a combination of two or more kinds thereof.

The concentration of the divalent or higher valent metal salt in a treatment liquid is not particularly limited. Particularly, the concentration of the divalent or higher valent metal salt is preferably 0.005 mol/liter or more and 0.5 mol/liter or less from a viewpoint of a fixing property. The concentration of the divalent or higher valent metal salt of 0.005 mol/liter or more can suppress feathering and color bleeding sufficiently. On the other hand, the concentration of the divalent or higher valent metal salt of 0.5 mol/liter or less improves a gloss property and texture of a printed matter, suppresses precipitation of a metal salt during storage of a treatment liquid, and therefore makes storage stability of the treatment liquid itself excellent.

Furthermore, the concentration of the divalent or higher valent metal salt in a treatment liquid is preferably adjusted appropriately according to the kind of the recording material. Specifically, when the recording material is a non-absorbing substrate, the concentration of the divalent or higher valent metal salt in a treatment liquid is preferably 0.005 mol/liter or more and 0.2 mol/liter or less. When the recording material is a low absorbing substrate, the concentration of the divalent or higher valent metal salt is preferably 0.05 mol/liter or more and 0.5 mol/liter or less. When the recording material is an absorbing substrate, the concentration of the divalent or higher valent metal salt is preferably 0.1 mol/liter or more and 0.5 mol/liter or less.

(2) Solvent

A solvent of a treatment liquid which can be used in the present invention preferably contains at least water, and if necessary, an organic solvent. The organic solvent is only required to be appropriately selected from solvents capable of dissolving a metal salt. Particularly, a solvent used in the ink composition of the present invention preferably contains an aqueous solvent. Note that the aqueous solvent means a solvent which dissolves 3 parts by mass or more of itself under 1 atm in 100 parts by mass of water at 25° C.

In the present invention, the total content ratio of water and an aqueous solvent is preferably 50% by mass or more, more preferably 70% by mass or more, and still more preferably 80% by mass or more relative to all the solvents from a viewpoint of metal salt solubility.

As a specific examples of the aqueous solvent, those exemplified as a water-soluble organic solvent in the ink composition can be used.

Among these solvents, a solvent having a boiling point of lower than 280° C. is preferable as the aqueous solvent in the present invention. The aqueous solvents can be used singly or in combination of two or more kinds thereof.

When an absorbing substrate is used as a recording material, water and an aqueous solvent are preferably used together from a viewpoint of suppressing curling and cockling (waving) of the substrate.

A solvent having a boiling point of 280° C. or higher in the present invention can be used in a range of 5 parts by mass or less relative to 100 parts by mass of the entire treatment liquid. By suppressing the amount used of the solvent having a boiling point of 280° C. or higher, a treatment liquid having an excellent drying property can be obtained. As a specific example of the solvent having a boiling point of 280° C. or higher, those listed in the description of the solvent of the ink composition can be used.

A method for applying a treatment liquid onto a recording material is not particularly limited, but the treatment liquid can be applied by an ink jet method, for example. When a treatment liquid is attached to a recording material by an ink jet method, a solvent having a boiling point of 180° C. or higher and lower than 280° C. is preferably used from a viewpoint of suppressing drying in an ink jet nozzle and making a drying property of a printed matter excellent. As a specific example of the solvent having a boiling point of 180° C. or higher and lower than 280° C., those listed in the description of the solvent of the ink composition can be used.

As an aqueous solvent, it is preferable to use a solvent having a viscosity of a diluent of 7 mPa·s or less when the aqueous solvent is diluted to 50% by mass with water. Preferable examples of the aqueous solvent having a viscosity of a diluent of 7 mPa·s or less when the aqueous solvent is diluted to 50% by mass with water include a monohydric alcohol, a diol, a triol, a monoalkyl ether, and a dialkyl ether. Specific examples thereof include ethylene glycol, diethylene glycol, triethylene glycol, propylene glycol, 1,2-butanediol, 1,2-hexanediol, 1,2-pentanediol, 1,3-propanediol, 1,3-butanediol diol, 1,4-butane diol, 3-methoxy-3-methyl-1-butanol, 3-methoxy-1-butanol, and glycerin. This is because a rapid rise in the viscosity of an ink composition after water in the ink composition is volatilized can be suppressed, and an ink composition having good flowability, a good continuous discharge property, and a good discharge property after leaving can be obtained.

Deionized water is preferably used as water contained in the solvent instead of water containing various ions. The content of water in the solvent is only required to be able to disperse or dissolve the above components, and is only required to be appropriately adjusted. Particularly, the content of water is preferably in a range of 10% by mass or more and 95% by mass or less, more preferably in a range of 20% by mass or more and 95% by mass or less, and still more preferably in a range of 30% by mass or more and 90% by mass or less relative to the total amount of solvents.

The content of an aqueous solvent in the solvent is preferably in a range of 5% by mass or more and 90% by mass or less, more preferably in a range of 5% by mass or more and 80% by mass or less, and still more preferably in a range of 10% by mass or more and 70% by mass or less relative to the total amount of solvents.

This is because the content of water and an aqueous solvent in the above ranges can make moisture retention sufficient and can suppress clogging of a nozzle or the like. In addition, this is because application by an ink jet method can make discharge from an ink jet head easy.

(3) Other Components

The treatment liquid in the present invention may further contain other components, if necessary. Examples of the other components include a basic compound for adjusting the pH, a surfactant for adjusting a surface tension, and a resin for imparting various forms of durability, such as scratch resistance, water resistance, solvent resistance, and blocking resistance, and gloss to a printed matter, or for improving an optical density.

As a specific example of the basic compound or the surfactant, those listed in the description of the basic compound or the surfactant as other components of the ink composition can be used. The content of the surfactant is preferably 0.01 parts by mass or more and 10.0 parts by mass or less, and more preferably 0.1 parts by mass or more and 5.0 parts by mass or less relative to 100 parts by mass of the total amount of a treatment liquid.

Examples of a resin contained in a treatment liquid which can be used in the present invention include a resin having a hydrophilic group, and cationic, nonionic, and anionic resin emulsions. Use of such a resin can impart various forms of durability such as scratch resistance, water resistance, solvent resistance, and blocking resistance to an obtained printed matter, or can improve gloss and a printing density of the printed matter. In addition, use of the resin emulsion can improve an adhesion property of a metal salt having a low adhesion property particularly to a non-absorbing substrate.

As a resin used for the resin emulsion, those listed in the description of the resin of the ink composition can be used. Examples thereof include an acrylic resin, a polystyrene resin, a polyester resin, a vinyl chloride resin, a vinyl acetate resin, a vinyl chloride vinyl acetate copolymer resin, a polyethylene resin, a urethane resin, a silicone resin, an acrylamide resin, an epoxy resin, and a copolymer resin and a mixture thereof. The acid value of a resin used in a treatment liquid is not particularly limited, but is preferably 0 mg KOH/g or more and 20 mg KOH/g or less from a viewpoint of suppressing aggregation and precipitation of metal salt. In a treatment liquid, the content ratio of the resin is not particularly limited, but is preferably 0.05 parts by mass or more and 20 parts by mass or less, more preferably 0.1 parts by mass or more and 15 parts by mass or less, and still more preferably 1 part by mass or more and 10 parts by mass or less relative to 100 parts by mass of the total amount of the treatment liquid from a viewpoint of stability of the resin in the treatment liquid and various forms of durability of a printed matter.

The surface tension of the treatment liquid is only required to be appropriately adjusted. Particularly, the surface tension of the treatment liquid is preferably 32 mN/m or less, more preferably 30 mN/m or less, still more preferably 28 mN/m or less, and further still more preferably 26 mN/m or less because wettability of the treatment liquid with respect to a printed surface of a recording material can be sufficient, color unevenness and white spots of a printed matter can be suppressed, and a clear image can be obtained. On the other hand, when the treatment liquid is attached to a substrate surface by an ink jet method, the surface tension of the treatment liquid is preferably 20 mN/m or more from a viewpoint of improving discharge stability of an ink composition from a discharge head.

In addition, it is preferable to adjust the surface tension of the treatment liquid according to the kind of a recording material. Preferably, the lower the absorbing property of the recording material is, the lower the surface tension of the treatment liquid is. Specifically, when an absorbing substrate is used as the recording material, the surface tension of the treatment liquid is preferably 32 mN/m or less. When a low absorbing substrate is used as the recording material, the surface tension of the treatment liquid is preferably 30 mN/m or less, and more preferably 28 mN/m or less. When a non-absorbing substrate is used as the recording material, the surface tension of the treatment liquid is preferably 28 mN/m or less, and more preferably 26 mN/m or less. Note that the surface tension of the treatment liquid can be adjusted by appropriately selecting the solvent and the surfactant.

[Ink Jet Recording Method and Method for Manufacturing Printed Matter]

An ink composition is attached to a portion of a recording material to which a treatment liquid adheres by an ink jet method. A method for attaching a treatment liquid to a recording material is not particularly limited as long as being an application method capable of attaching the treatment liquid only to a portion to be printed or to the entire printed surface, but a conventionally known method can be used. For example, a method for applying a treatment liquid by a spray method, a coater method, an ink jet method, a gravure method, or a flexographic method can be used. Among these methods, attachment is preferably performed by the coater method or the ink jet method. According to the coater method, it is possible to uniformly apply the treatment liquid in a short time. According to the ink jet method, it is easy to attach the treatment liquid to any location or to the entire printed surface. By applying an ink composition onto a recording material onto which the treatment liquid has been applied, color unevenness and white spots can be prevented, and feathering and color bleeding can be suppressed.

The ink composition of the present invention can be applied to any ink jet recording device such as a piezo type, a thermal type, or an electrostatic type. However, among these devices, the ink composition is preferably used with the piezo type ink jet recording device from a viewpoint of hardly causing generation of aggregates and having excellent discharge stability. In a recording head of the piezoelectric type, a piezoelectric vibrator is used as a pressure generating element, and the pressure in a pressure chamber is increased or decreased by deformation of the piezoelectric vibrator to discharge ink droplets. The type of an ink jet printing method is not particularly limited, but a serial head ink jet type or a line head ink jet type may be used.

In the present invention, by using the ink composition of the present invention with a resin having a lower value of A than a conventional resin (binder resin and a pigment-dispersing resin) and a compound represented by general formula (1) as an ink composition, an ink jet recording method achieving a clear image, hardly causing discharge defects such as clogging of an ink jet head nozzle, and having excellent discharge stability can be achieved.

A solvent contained in the ink composition of the present invention contains only less than 5 parts by mass of a solvent having a boiling point of 250° C. or higher, such as glycerin relative to 100 parts by mass of the ink composition. Therefore, a drying property can be enhanced even when a recording material is a non-absorbing or low absorbing recording medium. Therefore, when the recording medium is a non-absorbing or low absorbing recording medium, the ink jet recording method of the present invention is particularly effective.

Note that it is preferable to discharge the ink composition while a surface of the recording material is heated to 30° C. or higher and 60° C. or lower. By setting the surface temperature of the ink composition attachment portion of the recording material at the time of attachment of the ink composition to 30° C. or higher, wet-spreading of the ink composition is good even in a case of a low absorbing or non-absorbing substrate, and a clear printed matter can be manufactured. By setting the surface temperature of the ink composition attachment portion of the recording material at the time of attachment of the ink composition to 60° C. or lower, distortion of the substrate due to heat can be suppressed, a good image can be printed, fixation of the ink composition on a nozzle surface of a ink jet head is suppressed due to heat, and discharge stability can be maintained.

EXAMPLES

Hereinafter, the present invention will be described in more detail with reference to Examples, but the present invention is not limited to the description in any way.
1. Preparation of Pigment Dispersion
A pigment-dispersing resin was prepared by the following method. A mixture of 63 g of methyl methacrylate, 27 g of butyl acrylate, 30 g of butyl methacrylate, 15 g of acrylic acid, 15 g of methacrylic acid, and 3.6 g of tert-butylperoxy-2-ethylhexanoate was added dropwise to 200 g of toluene maintained at 100° C. over 1.5 hours. After completion of the dropwise addition, a reaction was caused at 100° C. for two hours, and then cooling was performed to obtain a resin solution. A resin was purified from the resin solution with hexane to obtain a pigment-dispersing resin having a molecular weight of 20,000 and an acid value of 143 mg KOH/g.

(1) Preparation of Pigment Dispersion P-1 (Red)
2.5 g of the pigment-dispersing resin obtained above and 0.6 g of N,N-dimethylaminoethanol were dissolved in 80 g of deionized water, and 15 g of C.I. Pigment Red 122 and 0.05 g of a defoaming agent ("Surfynol 104PG" manufactured by Air Products and Chemicals, Inc.) were added thereto. The resulting mixture was dispersed with a paint shaker using zirconia beads to obtain a pigment dispersion P-1 (red) having a mass ratio of pigment (C.I. Pigment Red 122)/pigment-dispersing resin of 15/2.5.

(2) Preparation of Pigment Dispersion P-2 (Blue) and Pigment Dispersion P-4 (Yellow)
A pigment dispersion P-2 (blue) having a mass ratio of pigment (C.I. Pigment Blue 15:4 (PB 15:4))/pigment-dispersing resin of 15/2.5 and a pigment dispersion P-4 (yellow) having a mass ratio of pigment (C.I. Pigment Yellow 155 (PY 155))/pigment-dispersing resin of 15/2.5 were obtained in a similar manner to the pigment dispersion P-1 (red) except that C.I. Pigment Blue 15:4 (PB 15:4) and C.I. Pigment Yellow 155 (PY 155) were used, respectively, in place of C.I. Pigment Red 122.

(3) Preparation of Pigment Dispersion P-3 (Black)
2.5 g of the pigment-dispersing resin obtained in the above P-1 and 0.6 g of N,N-dimethylaminoethanol were dissolved in 80 g of deionized water, and 15 g of carbon black, 0.3 g of a pigment-dispersing resin SOLSPERSE 47000 (molecular weight: 280,000, acid value: 20 mg KOH/g) in terms of a solid content, and 0.05 g of a defoaming agent ("Surfynol 104PG" manufactured by Air Products and Chemicals, Inc.) were added thereto. The resulting mixture was dispersed with a paint shaker using zirconia beads to obtain a pigment dispersion P-3 (black) having a mass ratio of pigment (carbon black)/pigment-dispersing resin of 15/2.8.

(4) Preparation of Pigment Dispersion P-5 (Red)
5.0 g of the pigment-dispersing resin obtained in the above P-1 and 1.2 g of N,N-dimethylaminoethanol were dissolved in 80.1 g of deionized water, and 15 g of C.I. Pigment Red 122 and 0.05 g of a defoaming agent ("Surfynol 104PG" manufactured by Air Products and Chemicals, Inc.) were added thereto. The resulting mixture was dispersed with a paint shaker using zirconia beads to obtain a pigment dispersion P-5 (red) having a mass ratio of pigment (C.I. Pigment Red 122)/pigment-dispersing resin of 15/5.0.

(5) Preparation of Pigment Dispersion P-6 (Black)
3.0 g of a pigment-dispersing resin (styrene-maleic acid polymer dispersant ("SMA 1440" having a weight average molecular weight of 7,000 and an acid value of 185 mg KOH/g, manufactured by SARTOMER Co.)) and 1.8 g of triethanolamine were dissolved in 80.1 g of deionized water, and 15 g of carbon black and 0.1 g of a defoaming agent ("Surfynol 104E" manufactured by Air Products and Chemicals, Inc.) were added thereto. The resulting mixture was dispersed with a paint shaker using zirconia beads to obtain a pigment dispersion P-6 (black) having a mass ratio of pigment (carbon black)/pigment-dispersing resin of 15/3.0.

2. Preparation of Resin Emulsion
A resin emulsion was prepared by the following method. Note that the average particle diameter of the resulting resin emulsion was measured using a concentration type particle size analyzer (Model: FPAR-1000 manufactured by Otsuka Electronics Co., Ltd.) at 25° C.

(1) Preparation of Resin Emulsion R-1

An inside of a flask equipped with a mechanical stirrer, a thermometer, a nitrogen gas inlet tube, a reflux tube, and a dropping funnel was sufficiently replaced with a nitrogen gas. Thereafter, 0.75 g of a reactive surfactant (manufactured by Kao Corporation, trade name: LATEMUL PD-104), 0.04 g of potassium persulfate, 1.5 g of methacrylic acid, and 150 g of pure water were added thereto, and were stirred and mixed at 25° C. A mixture of 115.5 g of methyl methacrylate, 18 g of 2-ethylhexyl acrylate, and 15 g of butyl acrylate was dropwise added to this mixture to prepare a pre-emulsion. Furthermore, an inside of a flask equipped with a mechanical stirrer, a thermometer, a nitrogen gas inlet tube, a reflux tube, and a dropping funnel was sufficiently replaced with a nitrogen gas. Thereafter, 3 g of a reactive surfactant (manufactured by Kao Corporation, trade name: LATEMUL PD-104), 0.01 g of potassium persulfate, and 200 g of pure water were stirred and mixed at 70° C. Thereafter, the prepared pre-emulsion was dropwise added to the flask over three hours. The resulting mixture was further heated and aged at 70° C. for three hours, then cooled, adjusted so as to have the pH of 8 with N,N-dimethylethanolamine, and filtered through a #150 mesh (manufactured by Nippon Tokushu Fabric) to obtain 500 g of resin emulsion R-1 (solid content: 30% by mass, glass transition temperature: 64° C., acid value: 7 mg KOH/g, hydroxy value: 0 mg KOH/g, average particle diameter: 90 nm, conductivity: 90 μs/cm).

(2) Preparation of Resin Emulsions R-2 to R-9

Resin emulsions R-2 to R-9 were also synthesized by adjusting a monomer composition as follows by a similar synthesis method to resin emulsion R-1.

R-2: 0.6 g of methacrylic acid, 135 g of methyl methacrylate, and 14.4 g of butyl acrylate (glass transition temperature: 82° C., acid value: 3 mg KOH/g, hydroxy value: 0 mg KOH/g, average particle diameter: 105 nm, conductivity: 70 μs/cm)

R-3: 3.5 g of methacrylic acid, 99.5 g of methyl methacrylate, 15.6 g of butyl methacrylate, and 31.5 g of butyl acrylate (glass transition temperature: 48° C., acid value: 15 mg KOH/g, hydroxy value: 0 mg KOH/g, average particle diameter: 120 nm, conductivity: 140 μs/cm)

R-4: 6 g of methacrylic acid, 90 g of methyl methacrylate, 39 g of 2-ethylhexyl acrylate, and 15 g of 4-hydroxybutyl acrylate (glass transition temperature: 7° C., acid value: 26 mg KOH/g, hydroxy value: 39 mg KOH/g, average particle diameter: 160 nm, conductivity: 380 μs/cm)

R-5: JONCRYL 1535 (glass transition temperature: 50° C., acid value: 98 mg KOH/g, average particle diameter: 160 nm, conductivity: 980 μs/cm)

R-6: JONCRYL 7640 (glass transition temperature: 85° C., acid value: 64 mg KOH/g, average particle diameter: 120 nm, conductivity: 700 μs/cm)

R-7: VINYBLAN 2706 (glass transition temperature: 21° C., acid value: 3 mg KOH/g, average particle diameter: 150 nm, conductivity: 80 μs/cm)

R-8: WATERSOL EFD-5501 (colloidal dispersion, acid value: 35 mg KOH/g)

R-9: JONCRYL 52J (water-soluble resin, glass transition temperature: 56° C., acid value: 238 mg KOH/g)

3. Preparation of Ink Composition

Ink compositions in Examples and Comparative Examples were prepared as shown in the following Tables 1 to 4 using a pigment dispersion, a resin emulsion, a solvent, a surfactant (nonionic compound), a surfactant (another surfactant), a wax emulsion, and deionized water. Note that the values of the resin emulsion and the wax emulsion indicate values in terms of a solid content.

Note that, as a solvent in Tables 1 to 4, PG indicates propylene glycol (boiling point: 187° C.), 13PD indicates 1,3-propanediol (boiling point: 214° C.), 12PD indicates 1,2-pentanediol (boiling point: 210° C.), GLY indicates glycerin (boiling point: 290° C.), TPG indicates tripropylene glycol (boiling point: 268° C.), and MFTG indicates tripropylene glycol monomethylether (boiling point: 242° C.)

As a surfactant (nonionic compound) in Tables 1 to 4, A-1 indicates a nonionic compound of $R=C_{18}$ and $n=13$ (Emulgen 320P (polyoxyethylene stearyl ether) (manufactured by Kao Corporation)), A-2 indicates a nonionic compound of $R=C_{18}$ and $n=30$ (Emulgen 430 (polyoxyethylene oleyl ether) (manufactured by Kao Corporation)), A-3 indicates a nonionic compound of $R=C_{18}$ and $n=50$ (Emulgen 350 (polyoxyethylene stearyl ether) (manufactured by Kao Corporation)), A-4 indicates a nonionic compound of $R=C_{13}$ and $n=50$ (Noigen TDS-500F (polyoxyethylene tridecyl ether) (manufactured by DKS Co., Ltd.)), A-5 indicates a nonionic compound of $R=C_{12}$ and $n=9$ (Emulgen 109P (polyoxyethylene lauryl ether) (manufactured by Kao Corporation)), A-6 indicates a nonionic compound of $R=C_{14}$ and $n=85$ (Emulgen 4085 (polyoxyethylene myristyl ether) (manufactured by Kao Corporation)), A-7 indicates a nonionic compound of R=polycyclic phenyl and $n=20$ (Emulgen A-90 (polyoxyethylene distyrenated phenyl ether) (manufactured by Kao Corporation)), A-8 indicates a nonionic compound of $R=C_{10}$ and $n=8$ (Noigen SD-80 (polyoxyethylene decyl ether) (manufactured by DKS Co., Ltd.)), A-9 indicates a nonionic compound of $R=C_{10}$ and $n=11$ (Noigen SD-110 (polyoxyethylene decyl ether) (manufactured by DKS Co., Ltd.)), A-10 indicates an anionic compound of $R=C_{12}$ and $n=16$ (HITENOL LA-16 (sodium polyoxyethylene lauryl ether sulfate) (manufactured by DKS Co., Ltd.)), A-11 indicates an anionic compound of $R=C_{12}$ and $n=10$ (KAO AKYPO RLM-10ONV (sodium polyoxyethylene lauryl ether acetate (manufactured by Kao Corporation)), A-12 indicates a nonionic compound of $R=C_{16}$ and $n=28$ (UNISAFE 20P-4 (polyoxyethylene (20) polyoxypropylene (8) cetyl ether) (manufactured by NOF CORPORATION)), and A-13 indicates a nonionic compound of R=H (EPAN 680 (polyoxyethylene polyoxypropylene glycol) (manufactured by DKS Co., Ltd.)).

As another surfactant (surface tension adjusting agent) in Tables 1 to 4, B-1 indicates a silicone surfactant (BYK-348), and B-2 indicates a silicone surfactant (BYK-349).

As a wax in Tables 1 to 4, W-1 indicates a polyethylene wax emulsion (PEM-17 (average particle diameter: 60 nm, melting point: 103° C.)), and W-2 indicates a polyethylene wax emulsion (AQUACER 515 (particle diameter: 150 nm, melting point: 130° C.)).

Values of A to D in Tables 1 to 4 were obtained by calculation according to the following definition from the amount of a pigment dispersant a (g) (mass of the pigment dispersant contained in 100 parts by mass of ink composition), an acid value of the pigment dispersant b (mg KOH/g), the amount of a binder resin c (g) (mass of the binder resin contained in 100 parts by mass of ink composition), and an acid value of the binder resin d (mg KOH/g).

a: content in terms of parts by mass of pigment-dispersing resin contained in 100 parts by mass of ink composition b: acid value of pigment-dispersing resin (mg KOH/g)

c: content in terms of parts by mass of binder resin contained in 100 parts by mass of ink composition d: acid value of binder resin (mg KOH/g)

Σ(a×b) represents a value of a×b when one pigment-dispersing resin is used, and the sum of values of a×b of pigment-dispersing resins when two or more pigment-dispersing resins are used.

Σ(c×d) represents a value of c×d when one binder resin is used, and represents the sum of values of c×d of binder resins when two or more binder resins are used.

Σa: sum of the content in terms of parts by mass of a pigment-dispersing resin in 100 parts by mass of ink composition Σc: sum of the content in terms of parts by mass of a binder resin in 100 parts by mass of ink composition value of $A=\Sigma(a \times b)+\Sigma(c \times d)$ value of $B=\Sigma(a \times b)$ value of $C=\Sigma(c \times d)$ value of $D=\Sigma a/\Sigma c$

[Storage Stability Test]

Ink compositions according to Examples and Comparative were subjected to a storage stability test. Specifically, an ink composition was sealed in a glass bottle, allowed to stand for two weeks under 60° C., and presence of occurrence of aggregation or precipitation was confirmed. Tables 1 to 4 show results hereof. A: Aggregation or precipitation did not occur. C: Aggregation or precipitation occurred.

[Discharge Stability Test]

Ink compositions according to Examples and Comparative were subjected to a discharge stability test. Specifically, an ink composition was subjected to continuous printing by an ink jet for three hours, and the number of nozzles with curved discharge or non-discharge was confirmed. Tables 1 to 4 show results thereof. A: The number of nozzles with curved discharge or non-discharge was less than 1% of the total number of nozzles. B: The number of nozzles with curved discharge or non-discharge was 1% or more and less than 3% of the total number of nozzles. C: The number of nozzles with curved discharge or non-discharge was 3% or more of the total number of nozzles. The ranges A and B are practical use ranges.

[Discharge Recoverability Test]

Ink compositions according to Examples and Comparative were subjected to a discharge recoverability test. Specifically, a nozzle with which an ink composition was printed by an ink jet was cleaned, and it was confirmed whether discharge was performed. Tables 1 to 4 show results thereof. A: Discharge was performed from all the nozzles after cleaning. C: Some nozzles exhibited curved discharge or non-discharge even after repeated cleaning.

[Liquid Repellency Test]

Ink compositions according to Examples and Comparative were subjected to a liquid repellency test. Specifically, it was confirmed whether an ink composition adhered to a head with which an ink composition was printed by an ink jet. Tables 1 to 4 show results thereof. A: No ink composition adhered to a head after printing. B: An ink composition slightly adhered to a head after printing. C: An ink composition adhered to a head after printing, and there was no liquid repellency. The ranges A and B are practical use ranges.

[Scratch Resistance Test]

Printed matters printed with ink compositions according to Examples and Comparative were subjected to a scratch resistance test. Specifically, an ink composition was subjected to solid printing by an ink jet, and was dried. Thereafter, a scratch resistance test was performed with a test cloth at a load of 200 g with 50 reciprocating rubs, and a printed matter was confirmed visually. Tables 1 to 4 show results thereof. A: No printed surface was peeled off at all. B: A test cloth was colored, but no printed surface was peeled off. C: A part of a printed surface was peeled off, and a substrate was exposed. The ranges A and B are practical use ranges.

[Drying Property Test]

Printed matters printed with ink compositions according to Examples and Comparative were subjected to a drying property test. Specifically, an ink composition was subjected to solid printing by an ink jet, and time required for drying a solid printing portion at 80° C. was confirmed. Tables 1 to 4 show results thereof. A: The portion was dried in less than three minutes. B: The portion was dried in three minutes or more and less than 10 minutes. C: The portion was dried in 10 minutes or more. The ranges A and B are practical use ranges.

[Water Resistance Test]

Printed matters printed with ink compositions according to Examples and Comparative were subjected to a water resistance test. Specifically, an ink composition was subjected to solid printing by an ink jet, a test piece in which a solid printing portion was dried at 100° C. for three minutes was wiped with deionized water, and a printed matter was confirmed visually. Tables 1 to 4 show results thereof. A: No change in a printed matter was observed. B: The color of a printed matter was slightly lighter. C: The color of a printed matter was clearly lighter. The ranges A and B are practical use ranges.

[Solvent Resistance Test]

Printed matters printed with ink compositions according to Examples and Comparative were subjected to a solvent resistance test. Specifically, an ink composition was subjected to solid printing by an ink jet, a test piece in which a solid printing portion was dried at 100° C. for three minutes was wiped with a 30% ethanol solution, and a printed matter was confirmed visually. Tables 1 to 4 show results thereof. A: No change in a printed matter was observed. B: The color of a printed matter was slightly lighter. C: The color of a printed matter was clearly lighter. The ranges A and B are practical use ranges.

TABLE 1

|  |  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Pigment | P-1 | 20.0 |  |  |  |  |  | 20.0 | 20.0 |  |  | 20.0 |  |  |
| dispersion | P-2 |  | 20.0 |  |  |  |  |  |  | 20.0 |  |  | 33.3 | 20.0 |
| (Parts by | P-3 |  |  | 20.0 |  |  |  |  |  |  | 20.0 |  |  |  |
| mass) | P-4 |  |  |  | 20.0 |  |  |  |  |  |  |  |  |  |
|  | P-5 |  |  |  |  | 20.0 |  |  |  |  |  |  |  |  |
|  | P-6 |  |  |  |  |  | 20.0 |  |  |  |  |  |  |  |

TABLE 1-continued

|  |  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Binder resin (Parts by mass) | R-1 | 6.0 | 6.0 | 6.0 | 6.0 | 6.0 | 6.0 |  |  |  |  | 6.0 |  | 6.0 |
|  | R-2 |  |  |  |  |  |  | 6.0 |  | 4.0 | 6.0 |  | 10.0 |  |
|  | R-3 |  |  |  |  |  |  |  | 8.0 | 4.0 |  |  |  |  |
|  | R-4 |  |  |  |  |  |  |  |  |  |  |  |  |  |
|  | R-5 |  |  |  |  |  |  |  |  |  |  |  |  |  |
|  | R-6 |  |  |  |  |  |  |  |  |  |  |  |  |  |
|  | R-7 |  |  |  |  |  |  |  |  |  |  |  |  |  |
|  | R-8 |  |  |  |  |  |  |  |  |  | 1.0 |  |  |  |
|  | R-9 |  |  |  |  |  |  |  |  |  |  |  |  |  |
| Solvent (Parts by mass) | PG | 40.0 | 40.0 | 40.0 | 40.0 | 40.0 | 40.0 | 40.0 | 45.0 | 40.0 | 40.0 | 40.0 |  |  |
|  | 13PD | 5.0 | 5.0 | 5.0 | 5.0 | 5.0 | 5.0 | 5.0 |  | 5.0 | 5.0 | 5.0 | 35.0 | 20.0 |
|  | 12PD |  |  |  |  |  |  |  |  |  |  |  | 5.0 | 20.0 |
|  | GLY |  |  |  |  |  |  |  |  |  |  |  |  |  |
|  | TPG |  |  |  |  |  |  |  |  |  |  |  |  | 4.0 |
|  | MFTG |  |  |  |  |  |  |  |  |  |  |  |  |  |
| Surfactant (Parts by mass) | A-1 | 0.5 | 0.3 | 0.3 | 0.5 | 0.5 | 0.5 | 0.5 | 0.5 |  |  | 0.5 | 0.5 | 0.5 |
|  | A-2 |  |  |  |  |  |  |  |  | 0.3 | 0.3 |  |  |  |
|  | A-3 |  |  |  |  |  |  |  |  |  |  |  |  |  |
|  | A-4 |  |  |  |  |  |  |  |  |  |  |  |  |  |
|  | A-5 |  |  |  |  |  |  |  |  |  |  |  |  |  |
|  | A-6 |  |  |  |  |  |  |  |  |  |  |  |  |  |
|  | A-7 |  |  |  |  |  |  |  |  |  |  |  |  |  |
|  | A-8 |  |  |  |  |  |  |  |  |  |  |  |  |  |
|  | A-9 |  |  |  |  |  |  |  |  |  |  |  |  |  |
|  | A-10 |  |  |  |  |  |  |  |  |  |  |  |  |  |
|  | A-11 |  |  |  |  |  |  |  |  |  |  |  |  |  |
|  | A-12 |  |  |  |  |  |  |  |  |  |  |  |  |  |
|  | A-13 |  |  |  |  |  |  |  |  |  |  |  |  |  |
| Surface tension adjusting agent (Parts by mass) | B-1 | 0.5 | 0.5 | 0.5 | 0.5 | 0.5 | 0.5 | 0.5 | 0.5 | 0.5 | 0.5 |  |  | 0.3 |
|  | B-2 |  |  |  |  |  |  |  |  |  |  | 0.5 | 0.5 |  |
| Wax (Parts by mass) | W-1 | 0.5 | 0.5 | 1.0 | 1.0 | 0.5 | 0.5 | 0.5 | 0.5 | 0.5 | 0.3 | 0.5 | 0.5 | 0.5 |
|  | W-2 |  |  |  |  |  |  |  |  |  |  |  |  |  |
| Deionized water (Parts by mass) |  | 27.5 | 27.7 | 27.2 | 27.0 | 27.5 | 27.5 | 27.5 | 25.5 | 25.7 | 26.9 | 27.5 | 15.2 | 28.7 |
| Sum |  | 100.0 | 100.0 | 100.0 | 100.0 | 100.0 | 100.0 | 100.0 | 100.0 | 100.0 | 100.0 | 100.0 | 100.0 | 100.0 |
| Value of A |  | 114 | 114 | 115 | 114 | 185 | 153 | 90 | 192 | 144 | 126 | 114 | 149 | 114 |
| Value of B |  | 72 | 72 | 73 | 72 | 143 | 111 | 72 | 72 | 72 | 73 | 72 | 119 | 72 |
| Value of C |  | 42 | 42 | 42 | 42 | 42 | 42 | 18 | 120 | 72 | 53 | 42 | 30 | 42 |
| Value of D |  | 0.08 | 0.08 | 0.09 | 0.08 | 0.17 | 0.10 | 0.08 | 0.06 | 0.06 | 0.09 | 0.08 | 0.08 | 0.08 |
| Storage stability |  | A | A | A | A | A | A | A | A | A | A | A | A | A |
| Discharge stability |  | A | A | A | A | A | A | A | A | A | B | A | A | A |
| Discharge recoverability |  | A | A | A | A | A | A | A | A | A | A | A | A | A |
| Liquid repellency |  | A | A | A | A | A | A | A | A | A | B | A | A | A |
| Scratch resistance |  | A | A | A | A | B | B | A | A | A | A | A | A | A |
| Drying property |  | A | A | A | A | A | A | A | A | A | A | A | A | B |
| Water resistance |  | A | A | A | A | A | A | A | A | A | A | A | A | A |
| Solvent resistance |  | A | A | A | A | B | B | A | B | A | B | A | A | B |

TABLE 2

|  |  | Example 14 | Example 15 | Example 16 | Example 17 | Example 18 | Example 19 | Example 20 | Example 21 | Example 22 | Example 23 | Example 24 | Example 25 | Example 26 |
|---|---|---|---|---|---|---|---|---|---|---|---|---|---|---|
| Pigment dispersion (Parts by mass) | P-1 |  |  | 20.0 | 20.0 | 20.0 | 20.0 | 20.0 |  | 13.3 |  | 20.0 | 6.7 |  |
|  | P-2 |  | 20.0 |  |  |  |  |  | 20.0 |  |  |  |  | 20.0 |
|  | P-3 |  |  |  |  |  |  |  |  |  |  |  |  |  |
|  | P-4 | 10.0 |  |  |  |  |  |  |  |  | 20.0 |  |  |  |
|  | P-5 |  |  |  |  |  |  |  |  | 13.3 |  |  |  |  |
|  | P-6 |  |  |  |  |  |  |  |  |  |  |  |  |  |
| Binder resin (Parts by mass) | R-1 | 6.0 | 6.0 | 6.0 | 6.0 | 6.0 | 6.0 | 6.0 | 10.0 | 5.0 | 10.0 | 6.0 | 3.0 |  |
|  | R-2 |  |  |  |  |  |  |  |  |  |  |  |  | 6.0 |
|  | R-3 |  |  |  |  |  |  |  |  |  |  |  |  |  |
|  | R-4 |  |  |  |  |  |  |  |  |  |  |  |  |  |
|  | R-5 |  |  |  |  |  |  |  |  |  |  |  |  |  |
|  | R-6 |  |  |  |  |  |  |  |  |  |  |  |  |  |
|  | R-7 |  |  |  |  |  |  |  |  |  |  |  |  |  |
|  | R-8 |  |  |  |  |  |  |  |  |  |  |  |  | 0.2 |

TABLE 2-continued

| | | Example 14 | Example 15 | Example 16 | Example 17 | Example 18 | Example 19 | Example 20 | Example 21 | Example 22 | Example 23 | Example 24 | Example 25 | Example 26 |
|---|---|---|---|---|---|---|---|---|---|---|---|---|---|---|
| | R-9 | | | | | | | | | | | | | |
| Solvent (Parts by mass) | PG | 40.0 | 35.0 | 40.0 | 40.0 | 35.0 | 40.0 | 35.0 | 40.0 | 40.0 | 40.0 | 40.0 | 40.0 | 40.0 |
| | 13PD | | | 5.0 | 5.0 | | 5.0 | | 5.0 | 5.0 | 5.0 | 5.0 | 5.0 | 5.0 |
| | 12PD | | | | | 10.0 | | | | | | | | |
| | GLY | | 2.0 | | | | | | | | | | | |
| | TPG | | | | | | | | | | | | | |
| | MFTG | 5.0 | | | | | | 10.0 | | | | | | |
| Surfactant (Parts by mass) | A-1 | 0.2 | | | | | | 0.5 | 0.5 | | 0.5 | | 0.5 | |
| | A-2 | | | 0.5 | | | | | | | | | | 0.3 |
| | A-3 | | 0.5 | | 0.5 | | 0.2 | | | 0.5 | | | | |
| | A-4 | | | | | 1.0 | | | | | | | | |
| | A-5 | | | | | | | | | | | | | |
| | A-6 | | | | | | | | | | | | | |
| | A-7 | | | | | | | | | | | | | |
| | A-8 | | | | | | | | | | | | | |
| | A-9 | | | | | | | | | | | | | |
| | A-10 | | | | | | | 0.2 | | | | | | |
| | A-11 | | | | | | | | | | | | | |
| | A-12 | | | | | | | | | | | | 0.5 | |
| | A-13 | | | | | | | | | | | | | |
| Surface tension adjusting agent (Parts by mass) | B-1 | 1.0 | | 0.5 | 0.5 | 0.5 | 0.5 | 0.5 | 0.5 | 0.5 | 0.5 | 0.5 | 0.5 | 0.5 |
| | B-2 | | 0.3 | | | | | | | | | | | |
| Wax (Parts by mass) | W-1 | 0.3 | | 0.5 | 0.5 | 0.5 | | | | 0.5 | | 0.5 | 0.5 | 0.3 |
| | W-2 | | 0.3 | | | | 0.3 | 0.5 | 3.0 | | | | | |
| Deionized water (Parts by mass) | | 37.5 | 35.9 | 27.5 | 27.5 | 27.0 | 27.8 | 27.5 | 21.0 | 21.9 | 24.0 | 27.5 | 43.8 | 27.7 |
| Sum | | 100.0 | 100.0 | 100.0 | 100.0 | 100.0 | 100.0 | 100.0 | 100.0 | 100.0 | 100.0 | 100.0 | 100.0 | 100.0 |
| Value of A | | 78 | 115 | 114 | 114 | 114 | 114 | 114 | 142 | 185 | 142 | 114 | 45 | 98 |
| Value of B | | 36 | 73 | 72 | 72 | 72 | 72 | 72 | 72 | 143 | 72 | 72 | 24 | 73 |
| Value of C | | 42 | 42 | 42 | 42 | 42 | 42 | 42 | 70 | 42 | 70 | 42 | 21 | 25 |
| Value of D | | 0.04 | 0.09 | 0.08 | 0.08 | 0.08 | 0.08 | 0.08 | 0.05 | 0.20 | 0.05 | 0.08 | 0.06 | 0.09 |
| Storage stability | | A | A | A | A | A | A | A | A | A | A | A | A | A |
| Discharge stablity | | A | A | A | A | A | A | A | B | A | A | B | A | A |
| Discharge recoverability | | A | A | A | A | A | A | A | A | A | A | A | A | A |
| Liquid repellency | | A | A | A | A | A | A | A | A | B | A | A | A | A |
| Scratch resistance | | A | A | A | A | A | A | A | A | B | B | A | A | A |
| Drying property | | A | B | A | A | A | A | A | A | A | A | A | A | A |
| Water resistance | | A | A | A | A | A | A | A | A | A | A | A | A | A |
| Solvent resistance | | A | B | A | A | A | A | A | A | B | A | A | A | A |

TABLE 3

| | | Comparative Example 1 | Comparative Example 2 | Comparative Example 3 | Comparative Example 4 | Comparative Example 5 |
|---|---|---|---|---|---|---|
| Pigment dispersion (Parts by mass) | P-1 | | | 20.0 | 20.0 | 20.0 |
| | P-2 | | | | | |
| | P-3 | | | | | |
| | P-4 | | | | | |
| | P-5 | 40.0 | | | | |
| | P-6 | | 40.0 | | | |
| Binder resin (Parts by mass) | R-1 | 6.0 | 6.0 | | | |
| | R-2 | | | | | |
| | R-3 | | | | | |
| | R-4 | | | 6.0 | | |
| | R-5 | | | | 6.0 | |
| | R-6 | | | | | 6.0 |
| | R-7 | | | | | |
| | R-8 | | | | | |
| | R-9 | | | | | |
| Solvent (Parts by mass) | PG | 40.0 | 40.0 | 40.0 | 40.0 | 40.0 |
| | 13PD | 5.0 | 5.0 | 5.0 | 5.0 | 5.0 |
| | 12PD | | | | | |
| | GLY | | | | | |
| | TPG | | | | | |
| | MFTG | | | | | |

TABLE 3-continued

| | | | | | | |
|---|---|---|---|---|---|---|
| Surfactant (Parts by mass) | A-1 | 0.5 | 0.5 | 0.5 | 0.5 | 0.5 |
| | A-2 | | | | | |
| | A-3 | | | | | |
| | A-4 | | | | | |
| | A-5 | | | | | |
| | A-6 | | | | | |
| | A-7 | | | | | |
| | A-8 | | | | | |
| | A-9 | | | | | |
| | A-10 | | | | | |
| | A-11 | | | | | |
| | A-12 | | | | | |
| | A-13 | | | | | |
| Surface tension adjusting agent (Parts by mass) | B-1 | 0.5 | 0.5 | 0.5 | 0.5 | 0.5 |
| | B-2 | | | | | |
| Wax (Parts by mass) | W-1 | 0.5 | 0.5 | 0.5 | 0.5 | 0.5 |
| | W-2 | | | | | |
| Deionized water (Parts by mass) | | 7.5 | 7.5 | 27.5 | 27.5 | 27.5 |
| Sum | | 100.0 | 100.0 | 100.0 | 100.0 | 100.0 |
| Value of A | | 328 | 214 | 228 | 660 | 456 |
| Value of B | | 286 | 172 | 72 | 72 | 72 |
| Value of C | | 42 | 42 | 156 | 588 | 384 |
| Value of D | | 0.33 | 0.20 | 0.08 | 0.08 | 0.08 |
| Storage stability | | A | A | C | C | C |
| Discharge stability | | A | A | C | C | C |
| Discharge recoverability | | A | A | A | A | A |
| Liquid repellency | | B | B | B | B | B |
| Scratch resistance | | B | B | B | B | B |
| Drying property | | B | B | A | A | A |
| Water resistance | | C | C | B | B | B |
| Solvent resistance | | C | C | C | C | C |

| | | Comparative Example 6 | Comparative Example 7 | Comparative Example 8 | Comparative Example 9 | Comparative Example 10 |
|---|---|---|---|---|---|---|
| Pigment dispersion (Parts by mass) | P-1 | 20.0 | 20.0 | 20.0 | 20.0 | 20.0 |
| | P-2 | | | | | |
| | P-3 | | | | | |
| | P-4 | | | | | |
| | P-5 | | | | | |
| | P-6 | | | | | |
| Binder resin (Parts by mass) | R-1 | | | | 6.0 | 6.0 |
| | R-2 | | | | | |
| | R-3 | | | | | |
| | R-4 | | | | | |
| | R-5 | | | | | |
| | R-6 | | | | | |
| | R-7 | 6.0 | | | | |
| | R-8 | | 6.0 | | | |
| | R-9 | | | 6.0 | | |
| Solvent (Parts by mass) | PG | 40.0 | 40.0 | 40.0 | 40.0 | 40.0 |
| | 13PD | 5.0 | 5.0 | 5.0 | | |
| | 12PD | | | | | |
| | GLY | | | | 8.0 | |
| | TPG | | | | | 10.0 |
| | MFTG | | | | | |
| Surfactant (Parts by mass) | A-1 | 0.5 | 0.5 | 0.5 | 0.5 | 0.5 |
| | A-2 | | | | | |
| | A-3 | | | | | |
| | A-4 | | | | | |
| | A-5 | | | | | |
| | A-6 | | | | | |
| | A-7 | | | | | |
| | A-8 | | | | | |
| | A-9 | | | | | |
| | A-10 | | | | | |
| | A-11 | | | | | |
| | A-12 | | | | | |
| | A-13 | | | | | |
| Surface tension adjusting agent (Parts by mass) | B-1 | 0.5 | 0.5 | 0.5 | 0.5 | 0.5 |
| | B-2 | | | | | |

TABLE 3-continued

| | | | | | | |
|---|---|---|---|---|---|---|
| Wax (Parts by mass) | W-1 | 0.5 | 0.5 | 0.5 | 0.5 | 0.5 |
| | W-2 | | | | | |
| Deionized water (Parts by mass) | | 27.5 | 27.5 | 27.5 | 24.5 | 22.5 |
| Sum | | 100.0 | 100.0 | 100.0 | 100.0 | 100.0 |
| Value of A | | 90 | 282 | 1500 | 114 | 114 |
| Value of B | | 72 | 72 | 72 | 72 | 72 |
| Value of C | | 18 | 210 | 1428 | 42 | 42 |
| Value of D | | 0.08 | 0.08 | 0.08 | 0.08 | 0.08 |
| Storage stability | | A | C | C | A | A |
| Discharge stability | | C | C | C | A | A |
| Discharge recoverability | | A | C | C | A | A |
| Liquid repellency | | B | C | C | A | A |
| Scratch resistance | | C | B | B | B | B |
| Drying property | | A | A | A | C | C |
| Water resistance | | B | B | C | B | B |
| Solvent resistance | | C | C | C | C | C |

TABLE 4

| | | Comparative Example 11 | Comparative Example 12 | Comparative Example 13 | Comparative Example 14 | Comparative Example 15 |
|---|---|---|---|---|---|---|
| Pigment dispersion (Parts by mass) | P-1 | 20.0 | 20.0 | 20.0 | 20.0 | 20.0 |
| | P-2 | | | | | |
| | P-3 | | | | | |
| | P-4 | | | | | |
| | P-5 | | | | | |
| | P-6 | | | | | |
| Binder resin (Parts by mass) | R-1 | 6.0 | 6.0 | 6.0 | 6.0 | 6.0 |
| | R-2 | | | | | |
| | R-3 | | | | | |
| | R-4 | | | | | |
| | R-5 | | | | | |
| | R-6 | | | | | |
| | R-7 | | | | | |
| | R-8 | | | | | |
| | R-9 | | | | | |
| Solvent (Parts by mass) | PG | 40.0 | 40.0 | 40.0 | 40.0 | 40.0 |
| | 13PD | 5.0 | 5.0 | 5.0 | 5.0 | 5.0 |
| | 12PD | | | | | |
| | GLY | | | | | |
| | TPG | | | | | |
| | MFTG | | | | | |
| Surfactant (Parts by mass) | A-1 | | | | | |
| | A-2 | | | | | |
| | A-3 | | | | | |
| | A-4 | | | | | |
| | A-5 | 0.5 | | | | |
| | A-6 | | 0.5 | | | |
| | A-7 | | | 0.5 | | |
| | A-8 | | | | 0.5 | |
| | A-9 | | | | | 0.5 |
| | A-10 | | | | | |
| | A-11 | | | | | |
| | A-12 | | | | | |
| | A-13 | | | | | |
| Surface tension adjusting agent (Parts by mass) | B-1 | 0.5 | 0.5 | 0.5 | 0.5 | 0.5 |
| | B-2 | | | | | |
| Wax (Parts by mass) | W-1 | 0.5 | 0.5 | 0.5 | 0.5 | 0.5 |
| | W-2 | | | | | |
| Deionized water (Parts by mass) | | 27.5 | 27.5 | 27.5 | 27.5 | 27.5 |
| Sum | | 100.0 | 100.0 | 100.0 | 100.0 | 100.0 |
| Value of A | | 114 | 114 | 114 | 114 | 114 |
| Value of B | | 72 | 72 | 72 | 72 | 72 |
| Value of C | | 42 | 42 | 42 | 42 | 42 |
| Value of D | | 0.08 | 0.08 | 0.08 | 0.08 | 0.08 |
| Storage stability | | A | A | A | A | A |
| Discharge stability | | C | C | C | C | C |
| Discharge recoverability | | C | C | C | C | C |
| Liquid repellency | | A | A | A | A | A |
| Scratch resistance | | A | A | A | A | A |
| Drying property | | A | A | A | A | A |

TABLE 4-continued

| | | | | | | |
|---|---|---|---|---|---|---|
| Water resistance | | A | A | A | A | A |
| Solvent resistance | | A | A | A | A | A |

| | | Comparative Example 16 | Comparative Example 17 | Comparative Example 18 | Comparative Example 19 | Comparative Example 20 |
|---|---|---|---|---|---|---|
| Pigment dispersion (Parts by mass) | P-1 | 20.0 | 20.0 | 20.0 | 20.0 | 20.0 |
| | P-2 | | | | | |
| | P-3 | | | | | |
| | P-4 | | | | | |
| | P-5 | | | | | |
| | P-6 | | | | | |
| Binder resin (Parts by mass) | R-1 | 6.0 | 6.0 | 6.0 | 6.0 | 6.0 |
| | R-2 | | | | | |
| | R-3 | | | | | |
| | R-4 | | | | | |
| | R-5 | | | | | |
| | R-6 | | | | | |
| | R-7 | | | | | |
| | R-8 | | | | | |
| | R-9 | | | | | |
| Solvent (Parts by mass) | PG | 40.0 | 40.0 | 40.0 | 40.0 | 40.0 |
| | 13PD | 5.0 | 5.0 | | 5.0 | 5.0 |
| | 12PD | | | | | |
| | GLY | | | 8.0 | | |
| | TPG | | | | | |
| | MFTG | | | | | |
| Surfactant (Parts by mass) | A-1 | | | 0.5 | | |
| | A-2 | | | | | |
| | A-3 | | | | | |
| | A-4 | | | | | |
| | A-5 | | | | | |
| | A-6 | | | | | |
| | A-7 | | | | | |
| | A-8 | | | | | |
| | A-9 | | | | | |
| | A-10 | 0.5 | | | | |
| | A-11 | | 0.5 | | | |
| | A-12 | | | | | |
| | A-13 | | | | 0.5 | |
| Surface tension adjusting agent (Parts by mass) | B-1 | 0.5 | 0.5 | 0.5 | 0.5 | 0.5 |
| | B-2 | | | | | |
| Wax (Parts by mass) | W-1 | 0.5 | 0.5 | | 0.5 | 0.5 |
| | W-2 | | | 6.0 | | |
| Deionized water (Parts by mass) | | 27.5 | 27.5 | 19.0 | 27.5 | 28.0 |
| Sum | | 100.0 | 100.0 | 100.0 | 100.0 | 100.0 |
| Value of A | | 114 | 114 | 114 | 114 | 114 |
| Value of B | | 72 | 72 | 72 | 72 | 72 |
| Value of C | | 42 | 42 | 42 | 42 | 42 |
| Value of D | | 0.08 | 0.08 | 0.08 | 0.08 | 0.08 |
| Storage stability | | A | A | A | A | C |
| Discharge stability | | C | C | C | C | C |
| Discharge recoverability | | C | C | C | C | C |
| Liquid repellency | | A | A | A | A | B |
| Scratch resistance | | A | A | C | A | A |
| Drying property | | A | A | C | A | A |
| Water resistance | | A | A | B | A | A |
| Solvent resistance | | A | A | C | A | A |

Tables 1 to 4 indicate that the ink jet recording-use ink composition of the present invention has good dispersion stability, hardly causes discharge defects such as clogging of an ink jet head nozzle, and has excellent discharge stability.

On the other hand, in Comparative Examples 1 to 5, 7, and 8, the value of A exceeded 200 mg KOH/g, and therefore discharge stability and solvent resistance were poor. Furthermore, in Comparative Examples 3 to 5 in which the value of C exceeded 150 mg KOH/g, discharge stability was also poor. Furthermore, in Comparative Examples 1 and 2 in which 20 parts by mass or more of a dispersion resin was contained relative to 100 parts by mass of a binder resin, water resistance was also poor.

Comparative Examples 7 and 8 use R-8 (colloidal dispersion) and R-9 (water-soluble resin) as a binder resin, and contain no resin emulsion. Therefore, dispersion stability was lowered, and discharge stability, discharge recoverability, liquid repellency, solvent resistance, and the like were poor.

In Comparative Examples 9, 10, and 18, the content of a solvent having a boiling point of 250° C. or higher was 5 parts by mass or more relative to 100 parts by mass of the ink composition, and therefore the drying property was poor. Furthermore, drying was performed insufficiently, and therefore solvent resistance was poor. Furthermore, in Comparative Example 18, the content of a wax emulsion was larger than that of a pigment, and therefore discharge stability was poor.

In Comparative Example 6, the value of A was 200 mg KOH/g or less, but the glass transition temperature of a resin emulsion as a binder resin was lower than 40° C., and therefore discharge stability and solvent resistance were poor.

It is indicated that the ink composition in Comparative Example 11 in which the repetition number n of $R^2$ representing an ethylene group or a propylene group in a nonionic compound represented by general formula (1) is less than 10 is an ink composition having poor discharge stability and discharge recoverability. It is estimated that this is because hydrophilicity of a surfactant is insufficient due to the small repetition number n of $R^2$ and dispersion stability of a resin emulsion in the ink composition is lowered.

It is indicated that the ink composition in Comparative Example 12 in which the repetition number n of $R^2$ representing an ethylene group or a propylene group in a nonionic compound represented by general formula (1) is more than 50 is an ink composition having poor discharge stability and discharge recoverability. It is estimated that this is because an alkylene oxide chain is longer due to the small repetition number n of $R^2$, affinity with a hydrophobic portion is insufficient, and therefore dispersion stability of a resin emulsion in the ink composition is lowered.

It is indicated that the ink compositions in Comparative Examples 14 and 15 in which the carbon number of a straight-chain or branched chain alkyl group $R^1$ in a nonionic compound represented by general formula (1) is less than 12 and the ink composition in Comparative Example 19 in which $R^1$ is H are ink compositions having poor discharge stability and discharge recoverability. It is estimated that this is because affinity with a hydrophobic portion of a resin emulsion in the ink composition is insufficient, and therefore dispersion stability of the resin emulsion is lowered.

Furthermore, it is indicated that the ink composition using an anionic compound as a surfactant as in Comparative Example 16 or 17 is an ink composition having poor discharge stability and discharge recoverability. It is estimated that this is because affinity with a hydrophobic portion of a resin emulsion in the ink composition is lowered due to an anionic hydrophilic group in the anionic compound, and therefore dispersion stability of the resin emulsion is lowered.

Furthermore, it is indicated that the ink composition using no nonionic compound or anionic compound as a surfactant as in Comparative Example 20 is an ink composition having poor discharge stability and discharge recoverability due to insufficient dispersion stability of a resin emulsion.

[Preparation of Treatment Liquid]
<Treatment Liquid 1>
1.5 parts by mass of calcium acetate, 1.0 part by mass of calcium pantothenate, 45 parts by mass of 1,2-propanediol (propylene glycol, boiling point: 188.2° C.), 0.5 parts by mass of BYK-349 (manufactured by BYK-Chemie GmbH, surface tension adjusting agent), and 52 parts by mass of deionized water were blended to obtain a treatment liquid 1.
<Treatment Liquid 2>
0.5 parts by mass of calcium acetate, 5 parts by mass (solid content) of 701 FE35 (vinyl chloride-acrylic resin manufactured by Nissin Chemical Co., Ltd.), 35 parts by mass of propylene glycol, 0.5 parts by mass of BYK-349 (manufactured by BYK-Chemie GmbH, surface tension adjusting agent), and 59 parts by mass of deionized water were blended to obtain a treatment liquid 2.

[Evaluation of Image Reproducibility of a Printed Matter onto which a Treatment Liquid has been Applied]

An ink jet head of an ink jet recording device PX-101 (manufactured by Seiko Epson Corporation) was filled with a treatment liquid (treatment liquid 1 or 2), the same image as an image to be printed with an ink composition was printed on a polyvinyl chloride film having no receiving layer. Thereafter, an ink jet head of another ink jet recording device PX-101 (manufactured by Seiko Epson Corporation) was filled with a combination of ink compositions in Examples 1 to 4 (yellow, red, blue, and black) or a combination of ink compositions in Examples 8, 9, 15 and 23 (yellow, red, blue, and black), and printing was performed to obtain a printed matter. Incidentally, printing was performed by setting the surface temperature of a recording medium at the time of landing of an ink composition to 40° C. Thereafter, drying was performed by setting the surface temperature of a printed matter to 80° C. The printed matter was subjected to a test for scratch resistance, drying property, solvent resistance, and image reproducibility. Incidentally, a printed matter onto which the treatment liquid had not been applied was also created, and evaluation was performed similarly.

[Image Reproducibility Test 1]
Ink compositions in Examples 1 to 4, 8, 9, 15, and 23 were printed in monochrome with 12 pt, and bleeding of letters was evaluated. Table 5 shows evaluation results thereof. A: Bleeding was not recognized, but an image was clear. B: Bleeding was slightly recognized, but an image was clear. C: Bleeding was recognized, and clearness was poor. The ranges A and B are practical use ranges.

[Image Reproducibility Test 2]
Ink compositions in Examples 1 to 4, 8, 9, 15, and 23 were printed such that 100% solid portions of yellow, red, blue, and black were adjacent to one another, and bleeding at boundary portions of the colors was evaluated. Table 5 shows evaluation results thereof. A: Bleeding was not recognized, but an image was clear. B: Bleeding was slightly recognized, but an image was clear. C: Bleeding was recognized, and there was a portion where a color boundary was not clear. The ranges A and B are practical use ranges.

TABLE 5

| | Ink composition | Example 1 | Example 2 | Example 3 | Example 4 | Example 8 | Example 9 | Example 15 | Example 23 |
|---|---|---|---|---|---|---|---|---|---|
| Without treatment liquid | Scratch resistance | A | A | A | A | A | A | A | B |
| | Drying property | A | A | A | A | A | A | B | A |
| | Solvent resistance | A | A | A | A | A | A | B | A |
| | Image reproducibility 1 | B | B | B | B | B | B | B | B |
| | Image reproducibility 2 | B | B | B | B | B | B | B | B |
| Treatment liquid 1 | Scratch resistance | A | A | A | A | A | A | A | A |
| | Drying property | A | A | A | A | A | A | A | A |
| | Solvent resistance | A | A | A | A | A | A | B | A |
| | Image reproducibility 1 | A | A | A | A | A | A | A | A |
| | Image reproducibility 2 | A | A | A | A | A | A | A | A |

TABLE 5-continued

| Ink composition | | Example 1 | Example 2 | Example 3 | Example 4 | Example 8 | Example 9 | Example 15 | Example 23 |
|---|---|---|---|---|---|---|---|---|---|
| Treatment liquid 2 | Scratch resistance | A | A | A | A | A | A | A | A |
| | Drying property | A | A | A | A | A | A | A | A |
| | Solvent resistance | A | A | A | A | A | A | B | A |
| | Image reproducibility 1 | A | A | A | A | A | A | A | A |
| | Image reproducibility 2 | A | A | A | A | A | A | A | A |

Table 5 indicates that a printed matter onto which a treatment liquid has been applied has less bleeding particularly for image reproducibility than a printed matter onto which a treatment liquid has not been applied, and obtains a good result. Therefore, it is indicated that the ink jet recording method including a treatment liquid applying step and an ink composition applying step according to the present invention is an excellent ink jet recording method.

The invention claimed is:

1. An ink jet recording-use ink composition comprising a binder resin, a surfactant, a pigment, a solvent, and if necessary, a pigment-dispersing resin which is a water-soluble resin, wherein
the ink composition includes a resin emulsion having a glass transition temperature of 40° C. or higher and 90° C. or lower as the binder resin,
a value of A defined by the following formula is 0 mg KOH/g or more and 200 mg KOH/g or less, value of $A = \Sigma(a \times b) + \Sigma(c \times d)$ (here, a represents the content in terms of parts by mass of the pigment-dispersing resin included in 100 parts by mass of the ink composition, b represents an acid value (mg KOH/g) of the pigment-dispersing resin, $\Sigma(a \times b)$ represents a value of a×b when one pigment-dispersing resin is used, and represents the sum of values of a×b of pigment-dispersing resins when two or more pigment-dispersing resins are used, c represents the content in terms of parts by mass of the binder resin included in 100 parts by mass of the ink composition, d represents an acid value (mg KOH/g) of the binder resin, and $\Sigma(c \times d)$ represents a value of c×d when one binder resin is used, and represents the sum of values of c×d of binder resins when two or more binder resins are used), and
the surfactant is a nonionic compound represented by the following general formula (1), and the content of a solvent having a boiling point of 250° C. or higher included in the solvent is less than 5 parts by mass relative to 100 parts by mass of the ink composition, $R^1O—(R^2O)_n—H$   (1)

($R^1$ is a straight-chain or branched chain alkyl group having 12 to 22 carbon atoms, $R^2$ represents an ethylene group or a propylene group,
n represents an integer of from 10 to 50).

2. The ink composition according to claim 1, wherein the content of the compound represented by the general formula (1) is 0.005% by mass or more and 2.0% by mass or less relative to the total amount of the ink composition.

3. The ink composition according to claim 2, comprising a (meth)acrylic resin as the pigment-dispersing resin, wherein
the content of the pigment-dispersing resin is 20 parts by mass or less relative to 100 parts by mass of the binder resin.

4. The ink composition according to claim 2, wherein a value of B defined by the following formula is 150 mg KOH/g or less, value of $B = \Sigma(a \times b)$ (here, a represents the content in terms of parts by mass of the pigment-dispersing resin included in 100 parts by mass of the ink composition, b represents an acid value (mg KOH/g) of the pigment-dispersing resin, and $\Sigma(a \times b)$ represents a value of a×b when one pigment-dispersing resin is used, and represents the sum of values of a×b of pigment-dispersing resins when two or more pigment-dispersing resins are used).

5. The ink composition according to claim 2, wherein a value of C defined by the following formula is 150 mg KOH/g or less, value of $C = \Sigma(c \times d)$ (here, c represents the content in terms of parts by mass of the binder resin included in 100 parts by mass of the ink composition, d represents an acid value (mg KOH/g) of the binder resin, and $\Sigma(c \times d)$ represents a value of c×d when one binder resin is used, and represents the sum of values of c×d of binder resins when two or more binder resins are used).

6. The ink composition according to claim 2, further comprising a wax emulsion, wherein
the content of the wax emulsion is equal to or lower than the content of the pigment.

7. The ink composition according to claim 2, wherein the solvent substantially contains no solvent having a boiling point of 280° C. or higher.

8. An ink jet recording method comprising: a treatment liquid applying step for applying a treatment liquid onto a recording material if necessary; and an ink composition applying step for applying the ink composition according to claim 2 onto the recording material, wherein at least the ink composition applying step is performed by an ink jet method.

9. The ink composition according to claim 1, comprising a (meth)acrylic resin as the pigment-dispersing resin, wherein
the content of the pigment-dispersing resin is 20 parts by mass or less relative to 100 parts by mass of the binder resin.

10. The ink composition according to claim 1, wherein a value of B defined by the following formula is 150 mg KOH/g or less, value of $B = \Sigma(a \times b)$ (here, a represents the content in terms of parts by mass of the pigment-dispersing resin included in 100 parts by mass of the ink composition, b represents an acid value (mg KOH/g) of the pigment-dispersing resin, and $\Sigma(a \times b)$ represents a value of a×b when one pigment-dispersing resin is used, and represents the sum of values of a×b of pigment-dispersing resins when two or more pigment-dispersing resins are used).

11. The ink composition according to claim 1, wherein a value of C defined by the following formula is 150 mg KOH/g or less, value of $C = \Sigma(c \times d)$ (here, c represents the content in terms of parts by mass of the binder resin included in 100 parts by mass of the ink composition, d represents an acid value (mg KOH/g) of the binder resin, and Σ(c×d) represents a value of c×d when one binder resin is used, and represents the sum of values of c×d of binder resins when two or more binder resins are used).

12. The ink composition according to claim 1, further comprising a wax emulsion, wherein
the content of the wax emulsion is equal to or lower than the content of the pigment.

13. The ink composition according to claim 1, wherein the solvent substantially contains no solvent having a boiling point of 280° C. or higher.

14. An ink jet recording method comprising: a treatment liquid applying step for applying a treatment liquid onto a recording material if necessary; and an ink composition applying step for applying the ink composition according to claim 1 onto the recording material, wherein at least the ink composition applying step is performed by an ink jet method.

15. The ink jet recording method according to claim 14, wherein the treatment liquid applying step is performed by an ink jet method.

16. The ink jet recording method according to claim 15, wherein the treatment liquid contains a polyvalent metal salt.

17. The ink jet recording method according to claim 15, wherein the recording material has a non-absorbing or low absorbing property.

18. The ink jet recording method according to claim 14, wherein the treatment liquid contains a polyvalent metal salt.

19. The ink jet recording method according to claim 14, wherein the recording material has a non-absorbing or low absorbing property.

20. The ink jet recording method according to claim 14, wherein the ink composition is discharged onto a surface of the recording material while being heated to 30° C. or higher and 60° C. or lower.

* * * * *